US011720087B1

(12) United States Patent
Heddleston et al.

(10) Patent No.: US 11,720,087 B1
(45) Date of Patent: *Aug. 8, 2023

(54) SYSTEMS AND METHODS FOR DYNAMIC MANUFACTURING LINE MONITORING

(71) Applicant: Samsara Inc., San Francisco, CA (US)

(72) Inventors: Katherine Lee Heddleston, San Francisco, CA (US); John Charles Bicket, San Francisco, CA (US); James Robert Saunders, San Francisco, CA (US); Peter Lee Atkin, San Francisco, CA (US)

(73) Assignee: Samsara Inc., San Francisco, CA (US)

( * ) Notice: Subject to any disclaimer, the term of this patent is extended or adjusted under 35 U.S.C. 154(b) by 115 days.

This patent is subject to a terminal disclaimer.

(21) Appl. No.: 17/412,146

(22) Filed: Aug. 25, 2021

Related U.S. Application Data

(63) Continuation of application No. 17/118,324, filed on Dec. 10, 2020, now Pat. No. 11,137,744.

(60) Provisional application No. 63/007,254, filed on Apr. 8, 2020.

(51) Int. Cl.
*G05B 19/418* (2006.01)

(52) U.S. Cl.
CPC ..... *G05B 19/4184* (2013.01); *G05B 19/4183* (2013.01); *G05B 2219/14063* (2013.01); *G05B 2219/23067* (2013.01)

(58) Field of Classification Search
USPC ........................................................ 700/79
See application file for complete search history.

(56) References Cited

U.S. PATENT DOCUMENTS

| | | | |
|---|---|---|---|
| 6,157,864 A * | 12/2000 | Schwenke | G06T 11/206 700/86 |
| 6,801,920 B1 | 10/2004 | Wischinski | |
| 7,596,417 B2 | 9/2009 | Fister et al. | |
| 7,957,936 B2 * | 6/2011 | Eryurek | G05B 23/0272 340/506 |
| 9,230,250 B1 | 1/2016 | Parker et al. | |
| 9,445,270 B1 | 9/2016 | Bicket et al. | |

(Continued)

OTHER PUBLICATIONS

Elias N. Malamas et al. "A survey on industrial vision systems, applications and tools", Sep. 17, 2002, Image and Vision Computing 21, pp. 171-188.

(Continued)

*Primary Examiner* — Md Azad
(74) *Attorney, Agent, or Firm* — Knobbe, Martens, Olson & Bear, LLP

(57) ABSTRACT

A system receives operations data and determines operations indicator(s) from the operations data. An operator on a manufacturing line reports a downtime event via a human machine interface device. The system receives downtime event and uptime information. The system calculates an operations indicator, such as an overall equipment effectiveness indicator, from the downtime event and uptime information. A user interface of the system includes the operations indicator(s) and visualizations. Some visualizations include a timeline indicating downtime events and other operations events. Additional downtime and uptime information is received by the system in substantially real-time. The system dynamically calculates updated operations indicator(s) from the additional downtime and uptime information.

20 Claims, 28 Drawing Sheets

(56) References Cited

U.S. PATENT DOCUMENTS

| | | | |
|---|---|---|---|
| 10,033,706 B2 | 7/2018 | Bicket et al. | |
| 10,085,149 B2 | 9/2018 | Bicket et al. | |
| 10,102,495 B1 | 10/2018 | Zhang et al. | |
| 10,173,486 B1 | 1/2019 | Lee et al. | |
| 10,196,071 B1 | 2/2019 | Rowson et al. | |
| 10,206,107 B2 | 2/2019 | Bicket et al. | |
| 10,388,075 B2 | 8/2019 | Schmirler et al. | |
| 10,390,227 B2 | 8/2019 | Bicket et al. | |
| 10,444,949 B2 * | 10/2019 | Scott | G05B 15/02 |
| 10,579,123 B2 | 3/2020 | Tuan et al. | |
| 10,609,114 B1 | 3/2020 | Bicket et al. | |
| 10,827,324 B1 | 11/2020 | Hajimiri et al. | |
| 10,843,659 B1 | 11/2020 | Innocenzi et al. | |
| 11,046,205 B1 | 6/2021 | Govan et al. | |
| 11,122,488 B1 | 9/2021 | Lloyd et al. | |
| 11,126,910 B1 | 9/2021 | Akhtar et al. | |
| 11,127,130 B1 | 9/2021 | Jain et al. | |
| 11,128,130 B2 | 9/2021 | Jain et al. | |
| 11,131,986 B1 | 9/2021 | Gal et al. | |
| 11,132,853 B1 | 9/2021 | Akhtar et al. | |
| 11,137,744 B1 | 10/2021 | Heddleston et al. | |
| 11,158,177 B1 | 10/2021 | ElHattab et al. | |
| 11,184,422 B1 | 11/2021 | Bicket et al. | |
| 11,188,046 B1 | 11/2021 | ElHattab et al. | |
| 11,190,373 B1 | 11/2021 | Stevenson et al. | |
| 11,341,786 B1 | 5/2022 | Calmer et al. | |
| 11,349,901 B1 | 5/2022 | Duffield et al. | |
| 11,352,013 B1 | 6/2022 | Srinivasan et al. | |
| 11,352,014 B1 | 6/2022 | Srinivasan et al. | |
| 11,356,605 B1 | 6/2022 | Shemet et al. | |
| 11,356,909 B1 | 6/2022 | Lloyd | |
| 11,365,980 B1 | 6/2022 | Akhtar et al. | |
| 11,386,325 B1 | 7/2022 | Srinivasan et al. | |
| 11,451,610 B1 | 9/2022 | Saunders et al. | |
| 11,451,611 B1 | 9/2022 | Saunders et al. | |
| 11,479,142 B1 | 10/2022 | Govan et al. | |
| 11,522,857 B1 | 12/2022 | Symons et al. | |
| 11,558,449 B1 | 1/2023 | Bicket et al. | |
| 11,599,097 B1 | 3/2023 | Gal et al. | |
| 11,606,736 B1 | 3/2023 | Lloyd et al. | |
| 2002/0169850 A1 | 11/2002 | Batke et al. | |
| 2013/0211559 A1 | 8/2013 | Lawson et al. | |
| 2014/0328517 A1 | 11/2014 | Gluncic | |
| 2014/0337429 A1 | 11/2014 | Asenjo et al. | |
| 2017/0060726 A1 | 3/2017 | Glistvain | |
| 2017/0123397 A1 | 5/2017 | Billi et al. | |
| 2017/0195265 A1 | 7/2017 | Billi et al. | |
| 2017/0278004 A1 * | 9/2017 | McElhinney | G06N 5/04 |
| 2018/0234514 A1 | 8/2018 | Rajiv et al. | |
| 2018/0356800 A1 * | 12/2018 | Chao | G06F 16/907 |
| 2018/0364686 A1 * | 12/2018 | Naidoo | G05B 19/0426 |
| 2019/0327613 A1 | 10/2019 | Bicket et al. | |
| 2020/0150739 A1 | 5/2020 | Tuan et al. | |
| 2020/0342230 A1 | 10/2020 | Tsai et al. | |
| 2020/0342235 A1 | 10/2020 | Tsai et al. | |
| 2020/0342274 A1 | 10/2020 | ElHattab et al. | |
| 2020/0342611 A1 | 10/2020 | ElHattab et al. | |
| 2020/0344301 A1 | 10/2020 | ElHattab et al. | |
| 2021/0006950 A1 | 1/2021 | Hajimiri et al. | |

OTHER PUBLICATIONS

U.S. Pat. No. 11,137,744, Systems and Methods for Dynamic Manufacturing Line Monitoring, Oct. 5, 2021.

* cited by examiner

Orange Line — Running  14:17:21

Back

Downtime Reasons

| Equipment Failure > | Power Failure |
| Planned Reason 1 | Planned Reason 2 |
| Malfunction 1 | Lunch (30 min) |

| | Work Orders | | | |
|---|---|---|---|---|
| Efficiency Summary | 🔍 Search | | Day ▽ | ◀ Mar 1 – Mar 7 ▶ Live |
| Runs | | | | |
| Lines | | | | Create Work Order |
| Products | | | | |
| Work Orders | | | | |
| Shift Schedules | Name | Product | Target Quantity | Production Date |
| | 1002 — Work Order #1 | Product 2 | 200 | Mar 3, 2020 12:16 PM  Completed |
| Lines | | | | |
| Blue Line | Work Order #2 | Product 8 | 1000 | Mar 2, 2020 1:20 PM |
| Green Line | | | | |
| Yellow | Work Order #3 | Product 1 | 100 | Mar 3, 2020 3:59 PM |
| Orange Line | | | | |

FIG. 10

SYSTEMS AND METHODS FOR DYNAMIC MANUFACTURING LINE MONITORING

INCORPORATION BY REFERENCE TO ANY PRIORITY APPLICATIONS

This application is a continuation of U.S. patent application Ser. No. 17/118,324, filed Dec. 10, 2020, and titled "SYSTEMS AND METHODS FOR DYNAMIC MANUFACTURING LINE MONITORING," which claims benefit of U.S. Provisional Patent Application Ser. No. 63/007,254, filed Apr. 8, 2020, and titled "SYSTEMS AND METHODS FOR DYNAMIC MANUFACTURING LINE MONITORING." The entire disclosure of each of the above items is hereby made part of this specification as if set forth fully herein and incorporated by reference for all purposes, for all that it contains.

Any and all applications for which a foreign or domestic priority claim is identified in the Application Data Sheet as filed with the present application are hereby incorporated by reference under 37 CFR 1.57.

TECHNICAL FIELD

Embodiments of the present disclosure relate to industrial controller devices, sensors, systems, and methods that allow for system monitoring and data acquisition and processing. Embodiments of the present disclosure further relate to devices, systems, and methods that provide interactive graphical user interfaces for monitoring manufacturing lines that are integrated with industrial controller devices, sensors, and systems.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Industrial controller systems, such as standard industrial control systems ("ICS") or programmable automation controllers ("PAC"), may include various types of control equipment used in industrial production, such as supervisory control and data acquisition ("SCADA") systems, distributed control systems ("DCS"), programmable logic controllers ("PLC"), and industrial safety systems. The industrial controller system can control various devices, such as, but not limited to, actuator devices, control valves, hydraulic actuators, magnetic actuators, electrical switches, motors, solenoids, cameras, and/or scanners. These devices collect data from sensors and sensor systems, monitor production counts, monitor the industrial process for alarm conditions, and so forth.

Overall equipment effectiveness ("OEE") is a measure of how well a manufacturing operation is utilized (e.g., facilities, time, and material) compared to its full potential, during the periods when it is scheduled to run. It identifies the percentage of manufacturing time that is truly productive. An OEE of 100% can mean that only good parts are produced (100% quality), at the maximum speed (100% performance), and without interruption (100% availability). An input to an OEE calculation can be equipment downtime, such as lunch breaks or malfunctions. Downtime can be captured manually, by machine, and/or some combination thereof. In some existing approaches, OEE is calculated manually. For example, OEE can be manually calculated on a whiteboard.

SUMMARY

The systems, methods, and devices described herein each have several aspects, no single one of which is solely responsible for its desirable attributes. Without limiting the scope of this disclosure, several non-limiting features will now be described briefly.

Some existing methods for determining manufacturing/industrial operations indicators, such as OEE, can be slow. For example, calculating OEE on a whiteboard can be slow and cumbersome. Some existing methods for determining operations indicators can also be inaccurate or misleading. For example, an existing OEE calculation may include planned downtime. Some existing methods can fail to capture operations indicators at a fine-grained level of detail. For example, in some existing systems, it may be difficult or impractical to break OEE out by line or product. Additionally or alternatively, in some existing systems, it may be difficult or impractical to determine OEE for multiple lines. Some existing methods can fail to capture operations indicators efficiently. For example, downtime may be tracked on a clipboard, but such methods may be cumbersome, slow to integrate into an OEE calculation, error-prone, and/or lack editing capabilities.

Advantageously, various embodiments of the present disclosure may overcome various disadvantages of prior systems and methods. For example, embodiments of the present disclosure may include industrial controller devices (also referred to herein as "controller devices") that may include built-in wireless and/or wired communications capabilities, data storage and offloading capabilities, and/or additional device control capabilities. An industrial controller device can be assigned to a manufacturing line. The controller device can communicate with a human machine interface ("HMI") device and a management server. In particular, the controller device can run a local web server and the HMI device can receive a graphical user interface through connecting to the local web server. An operator can monitor the line with the HMI device and can input downtime information and/or can select item or work order configurations. The controller device can transmit the received information to the management server. The controller device and its local web server can provide an easy-to-use interface that allows an operator to report operations information while not being too complicated or distracting, which, if otherwise, can be dangerous on a manufacturing line. The controller device and its local web server can provide a streamlined approach to report data to the management server. For example, the HMI device need not connect directly with the management server and the HMI device can be assigned to the controller, which can further streamline reporting data.

According to various embodiments of the present disclosure, a system can communicate with industrial controller devices. The industrial controller devices can include inputs and/or output configured to enable communications with the one or more assets associated with a process, such as a manufacturing line. The system can receive downtime event and uptime information from an industrial controller device. The system can calculate an operations indicator, such as an OEE, from the downtime event and uptime information. A user interface of the system can include visualizations, such as an operations time visualization, and the operations indicator(s). The operations time visualization can be configured to present downtime events, downtime event types, and uptime of the line. In particular, the operations time visualization can be configured to present a timeline that visually indicates the downtime events, downtime event types, and uptime of the line. The operations time visualization can be interactive. Additional downtime and uptime information can be received by the system. The system can calculate an updated operations indicator from the additional downtime and uptime information. The system can provide updated user interfaces with updated visualizations and the updated operations indicator(s). The updated visualization, such as an updated time visualization, can be configured to present an updated timeline with the additional downtime and uptime information.

In various embodiments, the system can include an industrial controller device. The industrial controller device can be configured to present, via a human machine interface device (such as a tablet), an operator user interface. The operator user interface can be configured to receive, from the human machine interface device, user input indicating the downtime event and the downtime event type. The industrial controller device can be configured to execute a web server. The operator user interface can be served by the web server executing on the industrial controller device. The system can include the human machine interface device (such as a tablet). The human machine interface device can be configured to receive the operator user interface served by the web server executing on the industrial controller device. The human machine interface device can also be configured to transmit, via the operator user interface, user input to the industrial controller device. The industrial controller device can be configured to transmit, to the management server, the downtime event that includes at least some of the user input (such as a user selected downtime event type/reason/category). Thus, a system with a management server, an industrial controller device, and/or the human machine interface device can coordinate transmitting operations data, including categorized downtime events, for use in calculating operations indicators.

In various embodiments, example operations indicators can include an overall equipment effectiveness (OEE) indicator, an availability indicator, a performance indicator, and/or a quality indicator. An operations indicator can represent an indicator for one or more lines. Calculating the operations indicator can further include aggregating operations data from multiple lines. An operations indicator can further represent an indicator for a line and a particular item output by the line. Thus, the user interface can include a respective operations indicator for: (i) the line and (ii) each item that is output by the line (such as performance or quality indicator of a line for a particular product).

In various embodiments, the system can receive, via a user interface, user input indicating an edit to a downtime event. The system can generate an updated downtime event based at least in part on the user input and can store the updated event. For example, the management server can provide user interfaces that allow analysts to edit some operations data, such as downtime events. An example edit to a downtime event can include a change in an event type.

In various embodiments, calculating the operations indicator can further include determining that a downtime event type (such as a planned downtime event type) should be ignored with respect to an availability calculation. Calculating the operations indicator can further include excluding a downtime event associated with the downtime event type from the availability calculation. An operations indicator can include the availability calculation. For example, a result of the availability calculation can be an availability indicator. As described herein, an operations indicator, such as OEE, can be a combination of availability, performance, and quality indicators.

In various embodiments, calculating an operations indicator can further be based on conditional operations logic. Specifically, calculating the operations indicator can further include making an initial determination that a particular event type should be ignored with respect to an availability calculation. For example, planned downtime events can be ignored by default with respect to an availability calculation. In other words, some event types (such as planned downtime events) may not count against availability by default. However, calculating the operations indicator can further include determining that some condition is satisfied with respect to the particular event type and event that is ignored by default, such as the duration of the downtime event satisfying some threshold. In response to determining that some condition is satisfied, the initial determination can be overridden. For example, if a planned downtime event exceeds some time threshold, such as an allotted thirty minutes for lunch, then the calculation for the operations indicator can include the event and/or some duration of the event.

In various embodiments, a configuration can be used to further determine the operations indicator. The system can receive, via a user interface, a run configuration. An example run configuration can include a downtime event. For example, the run configuration can be a defined shift and the shift can be applied to a run. The example shift can include planned downtime events, such as a lunch event or a maintenance event. Thus, a user can begin a run or otherwise configure the run by selecting a defined shift. Calculating the operations indicator can further include determining that the run configuration is associated with the line and determining the operations indicator based at least in part on the downtime event indicated by the run configuration.

As another example, the system can receive, via the user interface, an output configuration. The output configuration can include a target rate. For example, the output configuration can be a defined work order. The example work order can include a target rate, an item, a target quantity, and/or a target amount of time. Thus, a user can begin a run or otherwise configure the run by selecting a defined work order. Calculating the operations indicator can further include determining that output run configuration is associated with the line, calculating a performance indicator based at least in part on the target rate from the output configuration, and determining the operations indicator based at least in part on the performance indicator.

In various embodiments, large amounts of data may be automatically and dynamically gathered and analyzed in response to user inputs and configurations, and the analyzed data may be efficiently presented to users. Thus, in some embodiments, the systems, devices, configuration capabilities, graphical user interfaces, and the like described herein are more efficient as compared to previous systems, etc.

Further, as described herein, according to various embodiments systems and or devices may be configured and/or designed to generate graphical user interface data useable for rendering the various interactive graphical user interfaces described. The graphical user interface data may be used by various devices, systems, and/or software programs (for example, a browser program), to render the interactive graphical user interfaces. The interactive graphical user interfaces may be displayed on, for example, electronic displays (including, for example, touch-enabled displays). A management server can provide an analysis graphical user interface that allows a user to review the reported data, the operations indicators, and/or summary data in substantially real-time. As new downtime information is received, the graphical user interface can dynamically update, such as by recalculating the operations indicators. The operations graphical user interface can further allow a user to make post-hoc corrections to the reported data, such as changing and/or assigning event type for a downtime event. Performance metrics can be generated from the fine-grained operations information provided by the operator, such as, but not limited to, specific types of downtimes and product and run information. The dynamic graphical user interface can include a timeline that displays discrete events and respective event types that provides useful context to user. Moreover, the system can apply conditional logic for improved calculations of operations indicators. For example, in calculating the operations indicators, the logic can exclude planned downtime events and/or can include planned downtime events that go beyond some time limit.

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The present disclosure describes various embodiments of interactive and dynamic graphical user interfaces that are the result of significant development. This non-trivial development has resulted in the graphical user interfaces described herein which may provide significant cognitive and ergonomic efficiencies and advantages over previous systems. The interactive and dynamic graphical user interfaces include improved human-computer interactions that may provide reduced mental workloads, improved decision-making, improved capabilities, reduced work stress, and/or the like, for a user. For example, user interaction with the interactive graphical user interface via the inputs described herein may provide an optimized display of, and interaction with, controller devices, and may enable a user to more quickly and accurately access, navigate, assess, and digest analyses, configurations, received/operations data, and/or the like, than previous systems.

Further, the interactive and dynamic graphical user interfaces described herein are enabled by innovations in efficient interactions between the user interfaces and underlying systems and components. For example, disclosed herein are improved methods of receiving user inputs (including methods of interacting with, and selecting, received data), translation and delivery of those inputs to various system components (e.g., controller devices or management server(s)), automatic and dynamic execution of complex processes in response to the input delivery (e.g., execution of processes to calculate performance metrics and/or determine operations indicators), automatic interaction among various components and processes of the system, and automatic and dynamic updating of the user interfaces (to, for example, display the performance metrics and/or operations indicators). The interactions and presentation of data via the interactive graphical user interfaces described herein may accordingly provide cognitive and ergonomic efficiencies and advantages over previous systems.

Various embodiments of the present disclosure provide improvements to various technologies and technological fields, and practical applications of various technological features and advancements. For example, as described above, some existing systems are limited in various ways, and various embodiments of the present disclosure provide significant improvements over such systems, and practical applications of such improvements. Additionally, various embodiments of the present disclosure are inextricably tied to, and provide practical applications of, computer technology. In particular, various embodiments rely on detection of user inputs via graphical user interfaces, operation and configuration of controller devices, calculation of updates to displayed electronic data based on user inputs, automatic processing of received data, and presentation of updates to displayed data and analyses via interactive graphical user interfaces. Such features and others are intimately tied to, and enabled by, computer and industrial controller technology, and would not exist except for computer and industrial controller technology. For example, the industrial controller functionality and interactions with displayed data described below in reference to various embodiments cannot reasonably be performed by humans alone, without the computer and imaging technology upon which they are implemented. Further, the implementation of the various embodiments of the present disclosure via computer technology enables many of the advantages described herein, including more efficient interaction with, and presentation and analysis of, various types of electronic data, controller device/manufacturing line operation and configuration, and the like.

Various combinations of the above and below recited features, embodiments, and aspects are also disclosed and contemplated by the present disclosure.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

FIGS. 7A-7G illustrate example interactive graphical user interfaces related to event reporting via human machine interface ("HMI") devices, according to various embodiments of the present disclosure.

FIGS. 9A-9C and 10 illustrate example interactive graphical user interfaces directed towards production-related configuration, according to various embodiments of the present disclosure.

DETAILED DESCRIPTION

Figure 1:
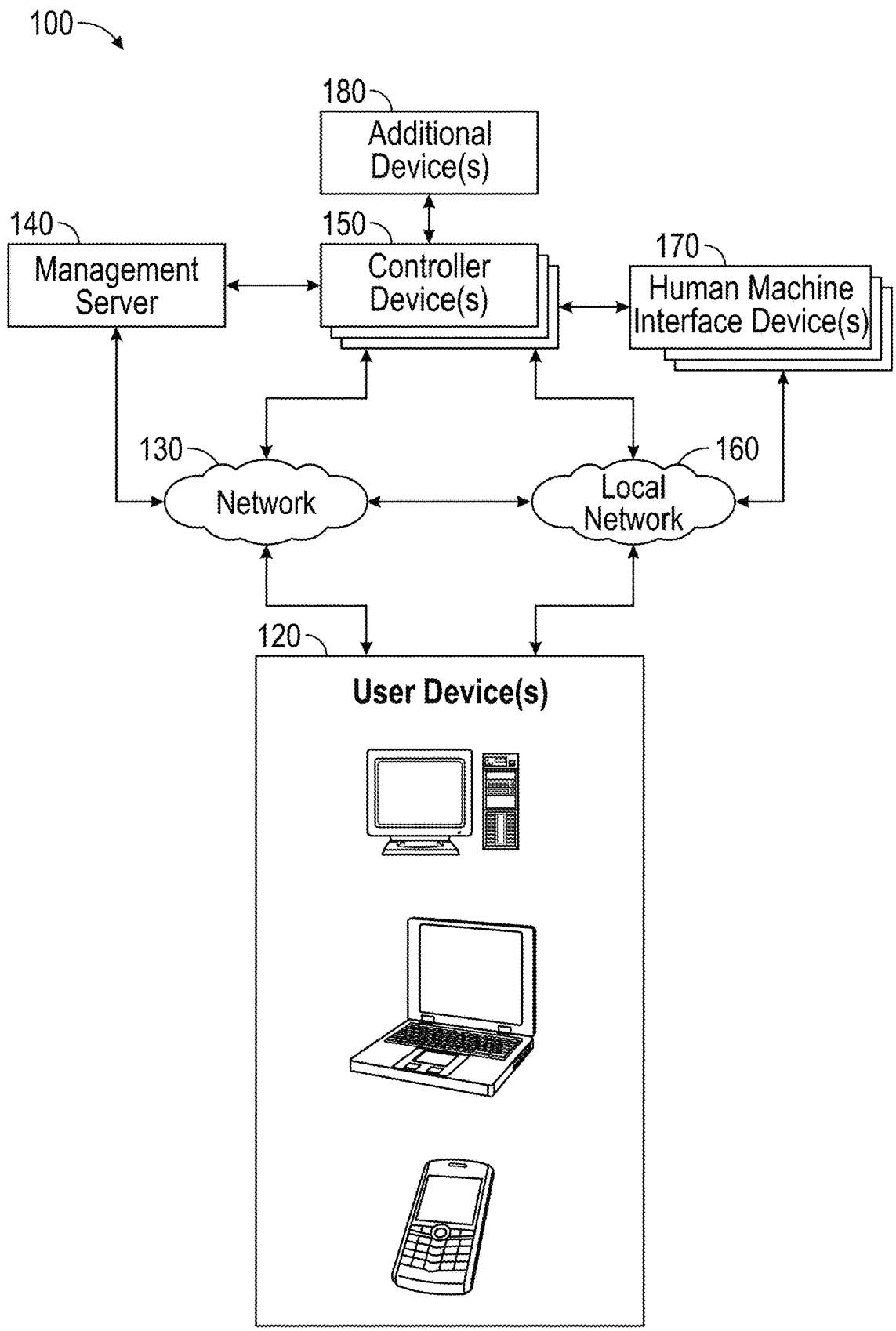
FIG. 1 illustrates a block diagram of an example operating environment in which one or more aspects of the present disclosure may operate, according to various embodiments of the present disclosure.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

I. Overview

As mentioned above, according to various embodiments of the present disclosure, an improved system can receive operations data and can determine operations indicator(s) from the operations data. The system can communicate with industrial controller device(s) on a line, such as a manufacturing line that produces an item. An operator on the line can report a downtime event via a human machine interface ("HMI") device, which can be connected to the industrial controller device. The system can receive downtime event and uptime information from an industrial controller device assigned to the line. A downtime event can be planned or unplanned. The system can determine to ignore planned downtime events with respect to calculating operations indicators, such as overall equipment effectiveness ("OEE"). The system can calculate an operations indicator, such as an OEE, from the downtime event and uptime information. For example, the system can calculate an availability indicator based on the downtime event and uptime information. Accordingly, the system can further calculate the operations indicator by combining availability, performance, and quality indicators. A user interface of the system can include the operations indicator(s) and visualizations. The visualizations can include a timeline indicating downtime events and other operations events. In particular, the timeline can present information, such as, but not limited to, downtime events, downtime event types, and uptime of the line. The user interfaces can allow a user to review the reported data, the operations indicators, and/or other operations data in substantially real-time. For example, additional downtime and uptime information can be received by the system in substantially real-time. The system can dynamically calculate an updated operations indicator from the additional downtime and uptime information. The user interfaces can present updated information including the updated operations indicator(s). The system can therefore provide real-time monitoring of manufacturing equipment effectiveness.

According to various embodiments of the present disclosure, the systems described herein can include further improvements. The graphical user interfaces described herein can allow a user to make post-hoc corrections to the reported data. Performance metrics can be generated from the fine-grained operations information provided by the operator, such as, but not limited to, specific types of downtimes and product and run information. The dynamic graphical user interfaces can include a timeline that displays discrete downtime events and respective event types that provides useful context to user. Moreover, the system can apply conditional logic for improved calculations of operations indicators. For example, in calculating the operations indicators, the logic can exclude planned downtime events and/or can include planned downtime events that go beyond some time limit.

In various embodiments, the controller devices may be configured to automatically connect to a remote management server (e.g., a "cloud"-based management server), and may offload received and analysis data to the remote management server via wired or wireless communications. A remote management server can also be referred to herein as a "management server." A remote management server can also be referred to as a "remote server." The controller devices may further communicate with the management server, user computing devices, and/or human machine interface devices, e.g., to provide remote access to the controller device, provide substantially real-time information from the controller device, receive configurations/updates, provide interactive graphical user interfaces, and/or the like.

In various embodiments, the management server may aggregate received data and/or analysis data from one or more controller devices, and provide statuses, alerts, analyses, etc., including via interactive graphical user interfaces that may be accessed via user computing devices. The management server may provide interactive graphical user interfaces through which a user may configure one or more controller devices.

In various embodiments, human machine interface ("HMI") devices may communicate with the controller devices, e.g., via accessing web servers running on the controller devices that provide interactive graphical user interfaces to the human machine interface devices. Users may thereby configure and/or monitor status of the controller devices and/or report aspects related to the line via the human machine interface devices. Typically, the human machine interface devices may communicate with the controller devices via a local network (e.g., a network local to, or on-site at, a particular organization).

In various embodiments, the controller devices may communicate with various additional devices, e.g., various components of a manufacturing line or process, sensors, etc. Such communications may be accomplished via one or more application programming interfaces ("APIs").

Various aspects of the present disclosure may individually and/or collectively provide various technical advantages as described herein, and may overcome various disadvantages of prior art systems and methods. For example, embodiments of the present disclosure may include industrial controller devices (also referred to herein as "controller devices"). The controller devices may automatically establish communication with a remote management server and may stream operations data to the remote management server. The controller devices may further include automatic offloading of received data to a remote database (e.g., via the management server). Such received data may be useable by the management server for providing further analyses, insights, alerts, etc. to users via interactive graphical user interfaces. The controller devices may provide remote access to live operations data via the management server. Human machine interface devices may communicate with the controller devices via wired or wireless, direct or networked communications. The controller devices may provide interactive graphical user interfaces to such human machine interface devices. Thus, according to various embodiments of the present disclosure, the controller devices and the management server may replace and streamline the multiple layers of technology of prior systems, while also providing added benefits and functionality over prior systems, and maintaining options for interfacing with and working with prior systems (e.g., existing sensors, PLCs, etc.).

Advantageously, according to various embodiments, the present disclosure may provide a modern platform that may combine data collection, control, alerts, and analytics in an easy to deploy and easy to use system—from the plant floor to remote sites. Embodiments of the present disclosure may enable management of controller devices from a secure cloud dashboard. Embodiments of the present disclosure may provide controller devices that combine the local control and data collection capabilities of a programmable logic controller ("PLC") or remote terminal unit ("RTU"), with a cellular gateway into a single device designed to meet the harsh demands of various industrial environments, including water/wastewater, oil and gas, and the like. Embodiments of the present disclosure may enable out-of-the-box visibility of substantially real-time and historical data, and simple alerting without the hassle of additional software or complexity that may be required in prior systems.

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the embodiments of the disclosure herein described.

II. Terms

In order to facilitate an understanding of the systems and methods discussed herein, a number of terms are defined below. The terms defined below, as well as other terms used herein, should be construed broadly to include the provided definitions, the ordinary and customary meaning of the terms, and/or any other implied meaning for the respective terms. Thus, the definitions below do not limit the meaning of these terms, but only provide example definitions.

User Input (also referred to as "Input"): Any interaction, data, indication, etc., received by a system/device from a user, a representative of a user, an entity associated with a user, and/or any other entity. Inputs may include any interactions that are intended to be received and/or stored by the system/device; to cause the system/device to access and/or store data items; to cause the system to analyze, integrate, and/or otherwise use data items; to cause the system to update to data that is displayed; to cause the system to update a way that data is displayed; and/or the like. Non-limiting examples of user inputs include keyboard inputs, mouse inputs, digital pen inputs, voice inputs, finger touch inputs (e.g., via touch sensitive display), gesture inputs (e.g., hand movements, finger movements, arm movements, movements of any other appendage, and/or body movements), and/or the like. Additionally, user inputs to the system may include inputs via tools and/or other objects manipulated by the user. For example, the user may move an object, such as a tool, stylus, or wand, to provide inputs. Further, user inputs may include motion, position, rotation, angle, alignment, orientation, configuration (e.g., fist, hand flat, one finger extended, etc.), and/or the like. For example, user inputs may comprise a position, orientation, and/or motion of a hand or other appendage, a body, a 3D mouse, and/or the like.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, PostgreSQL databases, etc.), non-relational databases (e.g., NoSQL databases, etc.), in-memory databases, spreadsheets, comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores. Additionally, although the present disclosure may show or describe data as being stored in combined or separate databases, in various embodiments such data may be combined and/or separated in any appropriate way into one or more databases, one or more tables of one or more databases, etc. As used herein, a data source may refer to a table in a relational database, for example.

III. Example Operating Environment

FIG. 1 illustrates a block diagram of an example operating environment 100 in which one or more aspects of the present disclosure may operate, according to various embodiments of the present disclosure. The operating environment 100 may include one or more user devices 120, a management server 140, controller device 150, one or more human machine interface devices 170, and one or more additional devices 180. The various devices may communicate with one another via, e.g., a communications network 130 and/or a local communications network 160, as illustrated.

In general, the controller device 150 comprises a housing including processor(s), memory, input/output ports, etc. that may be affixed to, or positioned near, e.g., an industrial process, a manufacturing line, one or more industrial machines, and/or the like. The controller device 150 provides outputs to, receives inputs from, and otherwise communicates with and/or controls, various additional systems and devices, e.g., associated with an industrial process. In general, the controller device 150 functions based on a configuration of the controller device 150, which may include various communications specifications (e.g., that indicate functionality of the input and output ports), executable program instructions/code, and/or the like. Based on the configuration, the controller device 150 may process or analyze data received via the ports of the controller device 150, and provide outputs or controls, cause sending of alerts, etc., based on the processing/analyses. Configurations of the controller device 150 may include various analysis algorithms, program instructions, scripts, etc., as described herein. Execution of the configuration may be performed on the controller device 150, rather than remotely, to enable rapid responses to the results of analyses of inputs to the controller device 150.

Received data and analysis results/data may be stored in a memory of the controller device 150 (e.g., a computer readable storage medium). The received data and analysis results may also be automatically transmitted from the controller device 150, e.g., to management server 140. The management server 140 may thereby receive data and analysis results from multiple controller devices 150, and may aggregate and perform further analyses on the received data and analysis results from multiple controller devices 150.

The management server 140 may communicate with the controller device(s) 150 to enable remote, rapid configuration of the controller device(s) 150. Such configuration may be accomplished via interactive graphical user interfaces provided by the management server 140 and accessible by the user device(s) 120, for example. Via the management server 140, and/or directly by communication with the controller device(s) 150, user device(s) 120 may access substantially real-time views of status, analysis, etc. of the controller device(s) 150. Communications with the controller device(s) 150 may be accomplished via web servers executing on the controller devices 150 themselves.

In some embodiments, the features and services provided by the management server 140 may be implemented as web services consumable via the network 130. In further embodiments, the management server 140 is provided by one or more virtual machines implemented in a hosted computing environment. The hosted computing environment may include one or more rapidly provisioned and released computing resources, which computing resources may include computing, networking and/or storage devices.

In general, the optional human machine interface ("HMI") device(s) 170 may be any computing device such as a desktop, laptop or tablet computer, personal computer, tablet computer, wearable computer, server, personal digital assistant (PDA), hybrid PDA/mobile phone, mobile phone, smartphone, set top box, voice command device, digital media player, and the like. A human machine interface device 170 may execute an application (e.g., a browser, a stand-alone application, etc.) that allows a user to access interactive user interfaces, view analyses or aggregated data, and/or the like as described herein. The human machine interface device(s) 170 may communicate with the controller device(s) 150, e.g., via accessing web servers running on the controller device(s) 150 that provide interactive graphical user interfaces to the human machine interface device(s) 170. Users may thereby configure and/or monitor status of the controller device(s) 150 via the human machine interface device(s) 170. Typically, the human machine interface device(s) 170 may communicate with the controller device(s) 150 via a local network (e.g., a network local to, or on-site at, a particular organization).

The optional additional device(s) 180 may comprise various components of a manufacturing/industrial line or process, sensors, and/or the like. The controller device(s) 150 may communicate with the additional device(s) 180 to receive information from the additional device(s) 180, and/or to provide outputs/controls to the additional device(s) 180. Communications with the additional device(s) 180 may be accomplished via one or more application programming interfaces ("APIs"). Communications with the additional device(s) 180 may also be accomplished via intermediate communications with existing or legacy devices, such as specialized PLCs and/or the like.

Various example user devices 120 are shown in FIG. 1, including a desktop computer, laptop, and a mobile phone, each provided by way of illustration. In general, the user devices 120 can be any computing device such as a desktop, laptop or tablet computer, personal computer, tablet computer, wearable computer, server, personal digital assistant (PDA), hybrid PDA/mobile phone, mobile phone, smartphone, set top box, voice command device, digital media player, and the like. A user device 120 may execute an application (e.g., a browser, a stand-alone application, etc.) that allows a user to access interactive user interfaces, view analyses or aggregated data, and/or the like as described herein. In various embodiments, users may interact with various components of the example operating environment 100 (e.g., the management server 140, the controller device(s) 150, the human machine interface device(s) 170, etc.) via the user device(s) 120. Such interactions may typically be accomplished via interactive graphical user interfaces; however, alternatively such interactions may be accomplished via command line and/or other means.

The network 130 may include any wired network, wireless network, or combination thereof. For example, the network 130 may be a personal area network, local area network, wide area network, over-the-air broadcast network (e.g., for radio or television), cable network, satellite network, cellular telephone network, or combination thereof. As a further example, the network 130 may be a publicly accessible network of linked networks, possibly operated by various distinct parties, such as the Internet. In some embodiments, the network 130 may be a private or semi-private network, such as a corporate or university intranet. The network 130 may include one or more wireless networks, such as a Global System for Mobile Communications (GSM) network, a Code Division Multiple Access (CDMA) network, a Long Term Evolution (LTE) network, or any other type of wireless network. The network 130 can use protocols and components for communicating via the Internet or any of the other aforementioned types of networks. For example, the protocols used by the network 130 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The local network 160 may similarly include any wired network, wireless network, or combination thereof. In general, however, the local network 160 illustrated in FIG. 1 represents a network that may be local to a particular organization, e.g., a private or semi-private network, such as a corporate or university intranet. In some implementations, devices may communicate via the local network 160 without traversing an external network 130 such as the Internet. In some implementations, devices connected via the local network 160 may be walled off from accessing the network 130 (e.g., the Internet), e.g., by a gateway device, unless specifically granted access to the network 130. Accordingly, e.g., the human machine interface device(s) 170 (and/or user device(s) 120) may communicate with the controller device 150 directly (via wired or wireless communications) or via the local network 160, without traversing the network 130. Thus, even if the network 130 is down, or is not currently providing connectivity to the management server 140, the controller device(s) 150 and the human machine interface device(s) 170 (and/or the user device(s) 120) may continue to communicate and function via the local network 160 (or via direct communications).

For example, the network 160 may be a personal area network, local area network, wide area network, over-the-air broadcast network (e.g., for radio or television), cable network, satellite network, cellular telephone network, or combination thereof. As a further example, the network 160 may be a publicly accessible network of linked networks, possibly operated by various distinct parties, such as the Internet. In some embodiments, the network 160 may be a private or semi-private network, such as a corporate or university intranet. The network 160 may include one or more wireless networks, such as a Global System for Mobile Communications (GSM) network, a Code Division Multiple Access (CDMA) network, a Long Term Evolution (LTE) network, or any other type of wireless network. The network 160 can use protocols and components for communicating via the Internet or any of the other aforementioned types of networks. For example, the protocols used by the network 160 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

In various embodiments, communications among the various components of the example operating environment 100 may be accomplished via any suitable means. For example, the controller device(s) 150 may communicate with one another, the additional device(s) 180, the human machine interface device(s) 170, the management server 140, and/or the user device(s) 120 via any combination of the network 130, the local network 160, or any other wired or wireless communications means or method (e.g., Bluetooth, WiFi, infrared, cellular, etc.).

Further details and examples regarding the implementations, operation, and functionality, including various interactive graphical user interfaces, of the various components of the example operating environment 100 are described herein in reference to various figures.

IV. Example Management Device/Server

Figure 2:
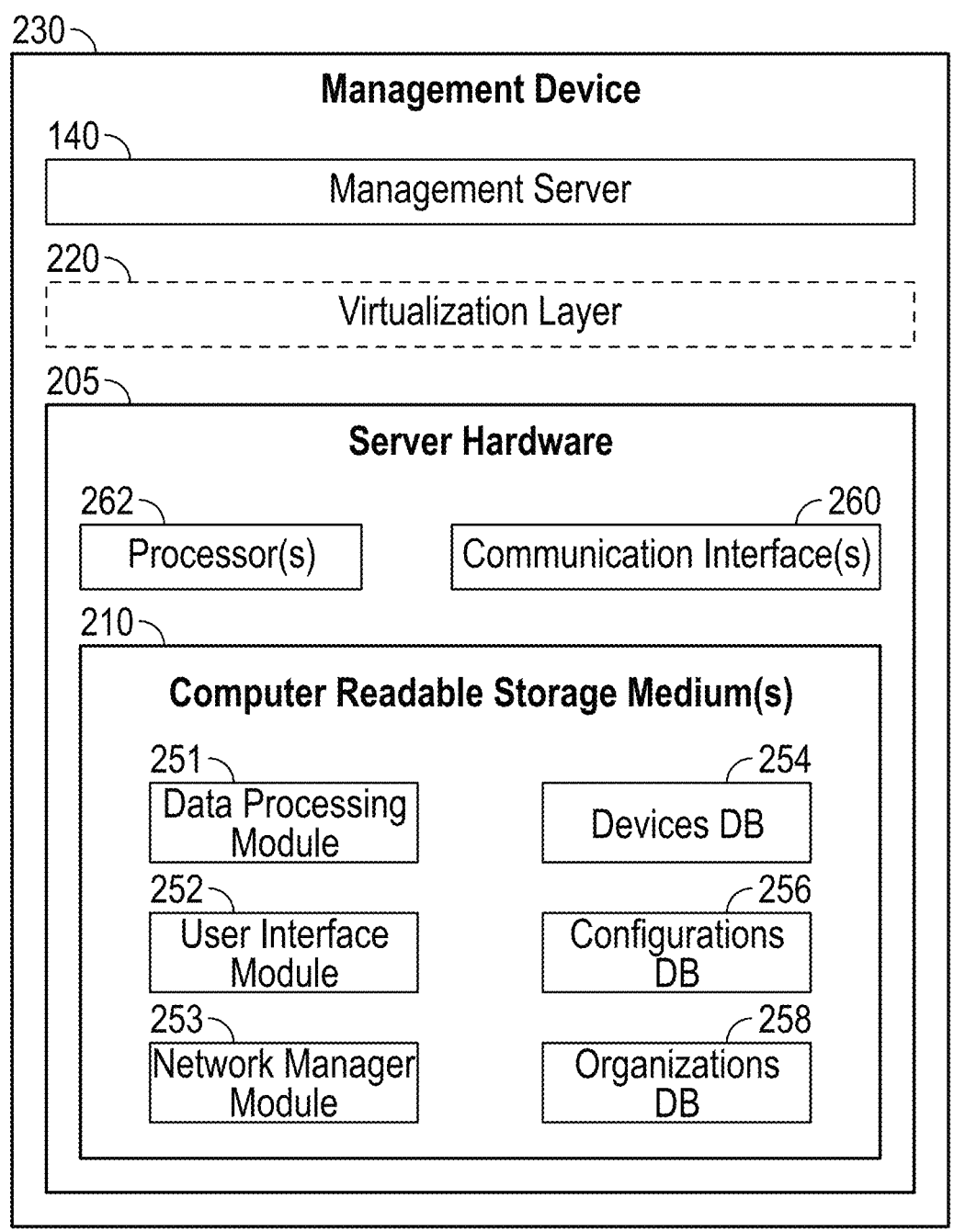
FIG. 2 illustrates a block diagram including an example implementation of a management device, according to various embodiments of the present disclosure.

FIG. 2 illustrates a block diagram including an example implementation of a management device 230, according to various embodiments of the present disclosure. In the example implementation, management device 230 includes management server 140, which management server 140 may be a Web or cloud server, or a cluster of servers, running on one or more sets of server hardware. In an embodiment, the management server 140 works for both single and multi-tenant installations, meaning that multiple organizations with different administrators may have, e.g., multiple controller devices, human machine interface devices, and additional devices managed by the same management server.

According to various embodiments, management server 140 may be implemented on management device 230 (or multiple devices similar to management device 230), which includes server hardware 205. Server hardware 205 includes one or more communication interfaces 260, one or more processors 262, and one or more computer readable storage mediums 210, each of which may be in communication with one another. The computer readable storage medium 210 includes data processing module 251, user interface module 252, network manager module 253, devices database 254, configurations database 256, and organizations database 258. In various implementations, the various databases of the management device 230 may be combined or separated/partitioned as appropriate to implement the functionality described herein, and to maintain security and separation of data, e.g., for different organizations. In various implementations, the various databases may or may not be stored separately from the management device 230.

In various implementations one or more buses, interconnects, wires/cables, etc. may be used to interconnect the various components of the server hardware 205. In various implementations one or more interfaces, APIs, communication layers, buses, interconnects, wires/cables, etc. may be used to interconnect the various components of the management device 230.

In operation, the one or more communication interfaces 260, one or more processors 262, and one or more computer readable storage mediums 210 communicate with one another to, e.g., execute by the processor(s) 262 computer program instructions (e.g., as provided by the user interface module 252); receive, access, and transmit data (e.g., to/from the databases and via the communication interface(s) 260); and/or the like. In general, the server hardware 205 enables the functionality of the management server 140 as described herein. Further implementation details are described below.

In operation, the communication interface(s) 260 may provide wired and/or wireless communications with other devices and networks, as described herein. In various embodiments, communications among the various components of the example operating environment 100 may be accomplished via any suitable means. For example, the management server 140 and/or management device 230 may communicate with the controller device 150, the human machine interface device(s) 170, the additional device(s) 180, and/or the user device(s) 120 via any combination of the network 130, the local network 160, or any other communications means or method (e.g., Bluetooth, WiFi, infrared, cellular, etc.). Accordingly, the communications interface(s) 260 may include one or more of wired and wireless transceivers, such as a Joint Test Action Group (JTAG) transceiver, a Bluetooth or Bluetooth Low Energy (LE) transceiver, an IEEE 802.11 transceiver, an Ethernet transceiver, a USB transceiver, a Thunderbolt transceiver, an infrared transceiver, a wireless cellular telephony transceiver (e.g., 2G, 3G, 4G, 5G), or the like.

In operation, data processing module 251 may provide processing and analysis of data (e.g., data received from the various devices, including the controller devices and/or additional devices) as described herein. The data processing/analysis may usefully provide insights and information that may be provided via various interactive graphical user interfaces, as described herein.

In operation, the user interface module 252 may provide the various interactive graphical user interface functionality described herein. This may include, for example, generating user interface data useable for rendering the various interactive user interfaces described. The user interface data may be used by various computer systems, devices, and/or software programs (for example, a browser program of a user device 120), to render the interactive user interfaces. The interactive user interfaces may be displayed on, for example, electronic displays (including, for example, touch-enabled displays). For example, the user interface module 252 may provide various network accessible interactive graphical user interfaces, e.g., to allow the administrators of the various organizations and devices to create and log into an account associated with an organization to which a set of devices belong (e.g., controller devices and additional devices), and manage, and access data associated with, those devices as described herein. As another example, the user interface module 252 may provide various network accessible interactive graphical user interfaces, e.g., to allow the analysts of the various organizations and devices to conduct operations analysis and/or operations configurations, as described herein.

In operation, the network manager module 253 may provide communication with and configuration and management of the various devices associated with each organization. This may include, for example, receiving and managing information related to the various devices (e.g., controller devices, additional devices, and human machine interface devices) at the time of manufacture, associating devices with particular organizations when they are purchased/claimed and implemented by the organizations (e.g., the claiming may be performed at least in part by populating the devices database 254 and the organizations database 258 with appropriate information when the devices are associated with an organization), receiving data from the various devices (e.g., and storing the data in the devices database 254 or other appropriate database), sending data to various devices (e.g., sending and/or syncing configurations stored in the configurations database 256 to/with various devices), and/or the like.

In operation, the devices database 254 may store information regarding the controller devices 150, human machine interface devices 170, and/or additional devices 180, and various relationships and associations among these devices. This information may include identifiers associated with these devices, data received from these devices, analysis data from these devices, etc.

In operation, the configurations database 256 may store information regarding configurations of the controller devices 150, human machine interface devices 170, and additional devices 180.

In operation, the organizations database 258 may store information regarding the organizations to which the controller devices 150, human machine interface devices 170, and additional devices 180 belong.

While not illustrated, the management server 140 can include an operations database. In operation, the operations database may store example information, such as, but not limited to, information regarding lines, output of the lines, runs, events, downtime data, uptime data, production data, item counts, target rates, calculated operations indicators, and/or operations data regarding the lines, as described herein. In particular, the operations database can store information regarding availability (such as downtime events and uptime), performance (such as the rate at which items are produced and target performance), and quality (such as the number of items that are considered "good" or "scrap"). The operations database can store configuration information, such as data related to production, shifts, and/or work orders.

In various embodiments, the management server 140, as implemented by the management device 230, may include various other modules, components, engines, etc. to provide the functionality as described herein. It will be appreciated that additional components, not shown, may also be part of the management server 140 and/or the management device 230, and, in certain embodiments, fewer components than that shown in FIG. 2 may also be used in the management server 140 and/or the management device 230. For example, the management server 140 may include a security module used to manage cryptographic keys, certificates, and/or other data associated with establishing secure communication with various other devices. For example, the devices database 254 may include an identifier of each device (e.g., a serial number), a secret to be used to establish a secure communication with the devices of the same organization, and/or a mechanism to authenticate the devices' identity (e.g., the public key of a private public key pair, the private key of which was embedded or stored in the device during the manufacturing, etc.).

While various embodiments do not implement virtualization, alternative embodiments may use different forms of virtualization—represented by a virtualization layer 220 in the management device 230. In these embodiments, the management server 140 and the hardware that executes it form a virtual management server, which is a software instance of the modules and/or databases stored on the computer readable storage medium 210.

For example, in an implementation the management device 230 (or one or more aspects of the management device 230, e.g., the management server 140) may comprise, or be implemented in, a "virtual computing environment." As used herein, the terms "virtual computing environment", "virtualization", "virtual machine", and/or the like should be construed broadly to include, for example, computer readable program instructions executed by one or more processors (e.g., as described below) to implement one or more aspects of the modules and/or functionality described herein. Further, in this implementation, one or more modules/engines/etc. (e.g., user interface module 252) and/or databases of the management device 230 may be understood as comprising one or more rules engines of the virtual computing environment that, in response to inputs received by the virtual computing environment, execute rules and/or other program instructions to modify operation of the virtual computing environment. For example, a request received from the user device(s) 120 may be understood as modifying operation of the virtual computing environment to cause modules to gather data, generate or transmit configurations, generate or transmit user interfaces, etc. Such functionality may comprise a modification of the operation of the virtual computing environment in response to inputs and according to various rules. Other functionality implemented by the virtual computing environment (as described throughout this disclosure) may further comprise modifications of the operation of the virtual computing environment, for example, the operation of the virtual computing environment may change depending on the information gathered and/or responses received and analyzed. Initial operation of the virtual computing environment may be understood as an establishment of the virtual computing environment. In some implementations the virtual computing environment may comprise one or more virtual machines, virtualization layers, containers, and/or other types of emulations of computing systems or environments. In some implementations the virtual computing environment may comprise a hosted computing environment that includes a collection of physical computing resources that may be remotely accessible and may be rapidly provisioned as needed (commonly referred to as "cloud" computing environment).

Implementing one or more aspects of the management device 230 as a virtual computing environment may advantageously enable executing different aspects or modules of the system on different computing devices or processors, which may increase the scalability of the system. Implementing one or more aspects of the management device 230 as a virtual computing environment may further advantageously enable sandboxing various aspects, data, or modules of the system from one another, which may increase security of the system by preventing, e.g., malicious intrusion into the system from spreading. Implementing one or more aspects of the management device 230 as a virtual computing environment may further advantageously enable parallel execution of various aspects or modules of the system, which may increase the scalability of the system. Implementing one or more aspects of the management device 230 as a virtual computing environment may further advantageously enable rapid provisioning (or de-provisioning) of computing resources to the system, which may increase scalability of the system by, e.g., expanding computing resources available to the system or duplicating operation of the system on multiple computing resources. For example, the system may be used by thousands, hundreds of thousands, or even millions of users simultaneously, and many megabytes, gigabytes, or terabytes (or more) of data may be transferred or processed by the system, and scalability of the system may enable such operation in an efficient and/or uninterrupted manner.

V. Example Controller Device

Figure 3:
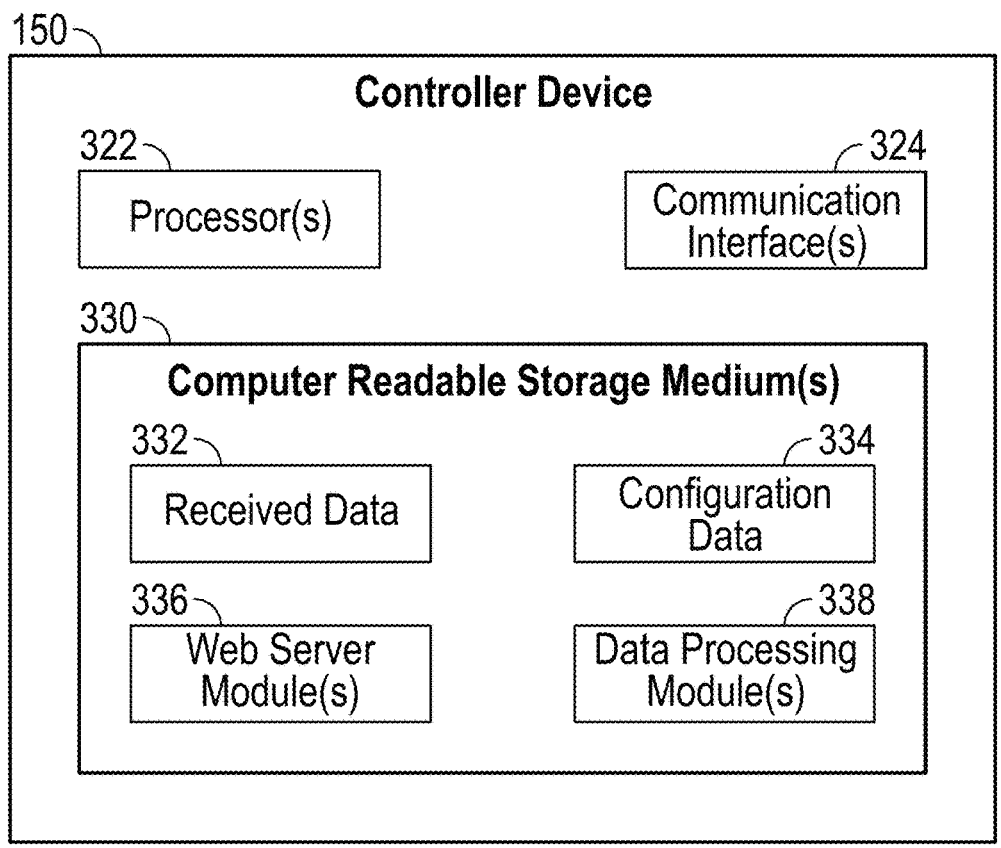
FIG. 3 illustrates a block diagram of an example controller device, according to various embodiments of the present disclosure.

FIG. 3 illustrates a block diagram of an example controller device 150, according to various embodiments of the present disclosure. Controller device 150 may comprise one or more processors 322, one or more communication interfaces 324, and one or more computer readable storage mediums 330, each of which may be in communication with one another. The computer readable storage medium(s) 330 may include received data 332, configuration data 334, web server module(s) 336, and data processing module(s) 338. The received data 332 and the configuration data 334 may be stored in one or more databases of the controller device 150. In various implementations one or more buses, interconnects, wires/cables, etc. may be used to interconnect the various components of the controller device 150, and of the controller device 150 more generally.

In operation, the one or more communication interfaces 324, one or more processors 322, and one or more computer readable storage mediums 330 communicate with one another to, e.g., execute by the processor(s) 322 computer program instructions (e.g., as provided by the configuration data 334, the web server module(s) 336, and/or the data processing module(s) 338); receive, access, and transmit data (e.g., to/from the received data 332 and/or configuration data 334, and via the communication interface(s) 324); and/or the like. Further implementation details are described below.

In operation, the communication interface(s) 324 may provide wired and/or wireless communications with other devices and networks, as described herein. In various embodiments, communications among the various components of the example operating environment 100 may be accomplished via any suitable means. For example, the controller device(s) 150 may communicate with one another, the additional device(s) 180, the human machine interface device(s) 170, the management server 140, and/or the user device(s) 120 via any combination of the network 130, the local network 160, or any other communications means or method (e.g., Bluetooth, WiFi, infrared, cellular, etc.). Accordingly, the communications interface(s) 324 may include one or more of wired and wireless transceivers, such as a Joint Test Action Group (JTAG) transceiver, a Bluetooth or Bluetooth Low Energy (LE) transceiver, an IEEE 802.11 transceiver, an Ethernet transceiver, a USB transceiver, a Thunderbolt transceiver, an infrared transceiver, a wireless cellular telephony transceiver (e.g., 2G, 3G, 4G, 5G), or the like. The communications interface(s) 324 may further include, for example, serial inputs/outputs, digital inputs/output, analog inputs/outputs, and the like. As noted herein, the communications interface(s) 324 may further include one or more application programming interfaces ("APIs").

In operation, the received data 332 includes any operations data, analysis data or results, or data received from the various additional devices 180 by the controller device 150, e.g., via the various input/output ports of the controller device 150. Such received data 332 may include data processed by the controller device 150 (e.g., via the data processing module(s) 338).

In operation, the configuration data 334 includes one or more configurations that configure operation of the controller device 150. For example, such configurations may be received from a user and/or the management device 230 (and/or other devices in communication with the controller device 150), and may include various communications specifications (e.g., that indicate functionality of the input and output ports), executable program instructions/code, algorithms or processes for processing the received data, and/or the like. The controller device 150 may store multiple configurations in the configuration data 334, which may be selectively run or implemented, e.g., via user selection via the management server 140, the human machine interface device(s) 170, and/or the user device(s) 120.

In operation, the web server module(s) 336 may include program code executable, e.g., by the processor(s) 322 to provide a web-based access (e.g., interactive graphical user interfaces accessible via web-based communications protocols, rendering of interactive graphical user interfaces written in web-based languages by web-based browsers, etc.) to the controller device 150, e.g., to configure the controller device 150 and/or access data of the controller device 150, as further described herein. Such web-based access may be via one or more communications protocols, e.g., TCP/IP, UDP, WebRTC, etc., and may include one or more secure communications/cryptographic protocols, e.g., TLS, SSL, etc., and may further be provided via communications interface(s) 324. This may include, for example, generating user interface data useable for rendering the various interactive user interfaces described. The user interface data may be used by various computer systems, devices, and/or software programs (for example, a browser program of a user device 120), to render the interactive user interfaces. The interactive user interfaces may be displayed on, for example, electronic displays (including, for example, touch-enabled displays). In various implementations one or more of the management server 140, user device(s) 120, and human machine interface device(s) 170 may communicate with the controller device 150 via one or more of the web server module(s) 336.

In operation, the data processing module(s) 338 may provide processing and analysis of received data. The type of processing and analysis may be provided by the configuration data 334, and may result in one or more outputs from the controller device 150 that may be provided via the communications interface(s) 324, as further described herein. In various implementations, the data processing module(s) 338 may be executed by the processor(s) 322, which processor(s) 322 may include various types of processors including special purposes processors, e.g., Graphics Processing Units ("GPUs"), Application Specific Integrated Circuits ("ASICs"), Field-Programmable Gate Arrays ("FPGAs"), and/or the like.

As described herein, received data, analysis results, and/or configuration data may be communicated, e.g., via the communications interface(s) 324, to other devices, such as the management server 140 and/or user device(s) 120. For example, the controller device 150 may be configured to reliably and securely offload data and to transmit the data to the management server 140 regardless of whether the connectivity of the controller device 150 (e.g., to the management server 140) is intermittent. For example, data may be stored by the controller device 150 until connectivity is available, and may then transmit the data to the management server 140.

In various implementations, as described above, the controller device(s) 150 may communicate with one or more additional devices 180, which may include, e.g., various components of a manufacturing/industrial line or process, sensors, etc. Communications with additional device(s) 180 may be via direct (e.g., not via a network) wired and/or wireless communications, and/or may be via a network (e.g., a local network) wired and/or wireless communications. Such communications may be accomplished via one or more APIs. Communications with the additional device(s) 180 may also be accomplished via intermediate communications with existing or legacy devices, such as specialized PLCs (e.g., the controller device 150 may include PCL control languages for communicating with PLCs, such as IEC 61131-3), and/or the like.

In various implementations, as described above, the controller device(s) 150 may communicate with one or more human machine interface devices 170. Communications with human machine interface device(s) 170 may be via direct (e.g., not via a network) wired and/or wireless communications, and/or may be via a network (e.g., a local network) wired and/or wireless communications. Via communications with the human machine interface device(s) 170, users may configure and/or monitor status of the controller device 150. As described herein, the controller device(s) 150 may advantageously communicate with the human machine interface device(s) 170 via the web server module(s) 336.

In various embodiments, the controller device 150, may include various other modules, components, engines, etc. to provide the functionality as described herein. It will be appreciated that additional components, not shown, may also be part of the controller device 150, and, in certain embodiments, fewer components than that shown in FIG. 3 may also be used in the controller device 150.

In various embodiments, firmware of the controller device 150 may be updated such that the controller device 150 may provide additional functionality. Such firmware updating may be accomplished, e.g., via communications with the management server 140, thereby enabling updating of multiple controller devices 150 remotely and centrally. Additional functionality may include, for example, additional communications specifications, additional ways of communicating with additional devices 180 (e.g., additional control languages, etc.), additional configurations or options for configurations, and/or the like.

VI. Example Human Machine Interface Device

Referring again to FIG. 1, human machine interface ("HMI") device(s) 170 may comprise computing devices that provide a means for a user to interact with a device. Human machine interfaces may comprise user interfaces or dashboards that connect a user with a machine, system, or device, commonly used in industrial processes. In various implementations, human machine interface device(s) 170 comprise computer devices with a display and a mechanism for user input (e.g., mouse, keyboard, voice recognition, touch screen, and/or the like). In an implementation, the human machine interface device(s) 170 comprise tablet computing devices.

As noted above, the human machine interface device(s) 170 may communicate with the controller device 150 and/or the management server 140 via direct (e.g., not via a network) wired and/or wireless communications, and/or via a network (e.g., a local network) wired and/or wireless communications. In one example, a human machine interface device 170 communicates with a controller device 150 via a local network and a web server module 336 of the controller device 150. In this example, the human machine interface device 170 is directed to connect with the controller device 150 (e.g., via an IP address and, optionally, a particular port of the controller device 150, or a unique identifier or name associated with the controller device 150) of the controller device 150, and the web server module 336 of the controller device 150 provides a browser-renderable webpage including an interactive HMI. The interactive HMI may include a current status or configuration of the controller device 150, options to change configuration of the controller device 150, and/or the like.

According to various embodiments, a user may configure an interactive HMI user interface layout via the management server 140 (and/or the controller device(s) 150 via the management server 140), and may then push the interactive HMI user interface layout configuration to controller device(s) 150 (e.g., via the management server 140). The controller device(s) 150 may then provide the configured interactive HMI via the web server module(s) 336 as described herein. Such functionality may enable remote and centralized configuration of interactive HMIs (and possible duplication of HMIs to multiple controller devices 150) without requiring direct programming or interaction with the controller device(s) 150 or human machine interface device(s) 170.

Advantageously, because the HMI is provided by a web server module 336 of the controller device 150, multiple human machine interface devices 170, and/or the management server 140 may simultaneously access and/or communicate with the controller device 150 (e.g., via the HMI provided via the web server module(s) 336, and/or via other communications means), and a current configuration/status of the controller device 150 may be accurately kept synchronized/kept up-to-date from each device.

VII. Example Additional Devices

Referring again to FIG. 1, additional device(s) 180 may include, e.g., various components of a manufacturing/industrial line or process, sensors, and/or the like. For example, additional device(s) 180 may include detector devices that may include a trigger input to the controller device(s) 150, reject devices to which the controller device(s) 150 may provide an output to reject articles, machinery inputs to which the controller device(s) 150 may provide an output in response to various data analyses (e.g., to speed up or slow down a manufacturing process, to adjust a manufacturing process, to actuate or operate a machine, to execute a process, to activate or deactivate a light or process, to communicate with an automated process or device, to communicate with a software program, etc.), multiple components/devices on a manufacturing line to which the controller device(s) 150 may provide configurations, sensors that may provide controller device(s) 150 with input information that may be used by the controller device(s) 150 and/or provided by the controller device(s) 150 to the management server 140, and/or the like. Additional non-limiting examples of additional device(s) 180 include:

Sensors/monitors (e.g., temperature, levels, vibration, power, pressure, etc.)

Facility meters (e.g., water, air, gas, energy, steam, etc.)

Machine/systems I/O (e.g., relays, contacts, valves, flow, etc.)

Legacy equipment (e.g., programmable logic controllers ("PLCs"), controllers, etc.)

Additional device(s) 180 may be communicated with and/or configured via the controller device(s) 150. Communications with the additional device(s) 180 may also be accomplished via intermediate communications with existing or legacy devices, such as specialized PLCs and/or the like. Alternatively, additional device(s) 180 may be communicated with and/or configured via communication with human machine interface device(s) 170, management server 140, and/or user device(s) 120. Data and information gathered from the additional device(s) 180 may be provided to the management server 140, e.g., via the controller device(s) 150 and/or directly (e.g., via a network).

In various implementations one or more of, or a combination of, the controller device(s) 150, the management server 140, and/or the human machine interface device(s) 170 may provide an application programming interface ("API") by which communications may be accomplished with the additional device(s) 180.

VIII. Example Controller Device Physical Implementation

Figure 4:
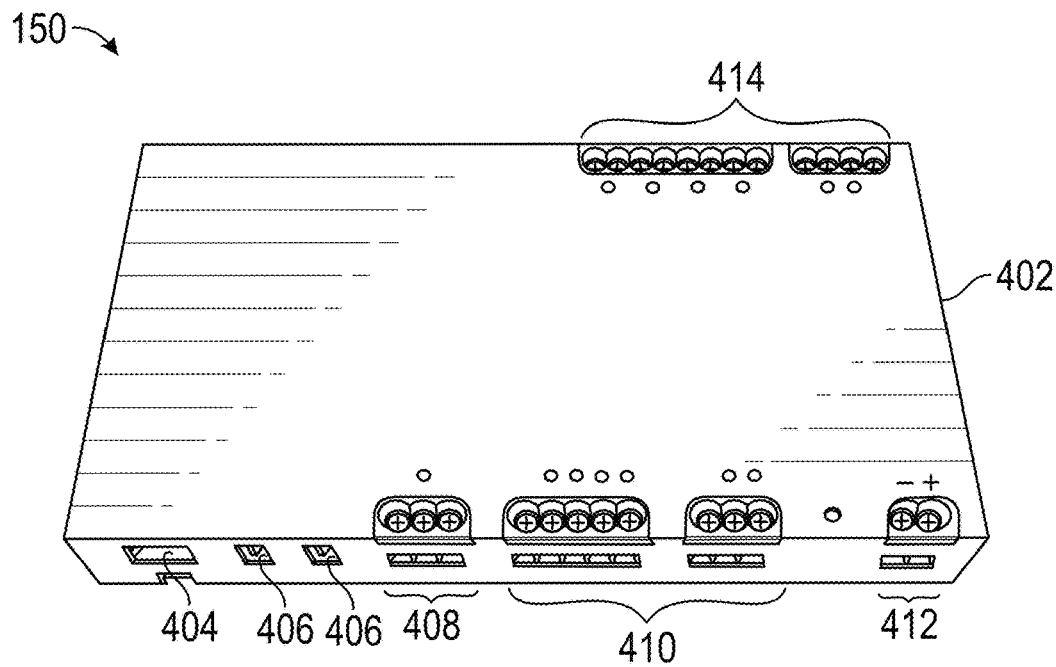
FIG. 4 is a diagram of an example physical implementation of a controller device, according to various embodiments of the present disclosure.

FIG. 4 is a diagram of an example physical implementation of the controller device 150, according to various embodiments of the present disclosure. As described herein, while the embodiment described in reference to FIG. 4 shows one example implementation of the controller device 150, other implementations are contemplated, including implementations that place the various communications interfaces 324 in different locations, or that include more or fewer communications interfaces 324, etc. In various implementations, the controller device 150 may support scalable expansion input/output ("I/O") modules for higher density applications.

FIG. 4 shows a front perspective view of the controller device 150. As shown, the controller device 150 may include a housing 402, which may be made of metal (e.g., aluminum, stainless steel, etc.), plastic (e.g., UV-stabilized polycarbonate, etc.), and/or any other suitable material or combination of materials. The housing 402 may include various ports/connectors (e.g., communications interfaces 324), e.g., for interfacing with additional device(s) 180. For example, the controller device 150 may include an Ethernet port 404, one or more USB ports 406, serial I/O ports 408 (e.g., RS232, RS485, and/or the like), digital I/O ports 410 (which may include counters), and analog I/O ports 414. The controller device 150 may further include power ports 412.

In an implementation, the serial I/O ports 408 are ESD protected, and support RS485 (up to 20 Mbps, 2-wire, half-duplex), RS232 (up to 1 Mbps, 2-wire, full or half-duplex), and various serial protocols (e.g., Modbus slave/master). Various other implementations and specifications of the serial I/O ports 408 are contemplated.

In an implementation, the digital I/O ports 410 may include six pins, each being configurable as input or outputs (open-drain), with ESD/EFT/Surge protection. As inputs, the digital I/O ports 410 may provide dry-contact (internally sourced 3.3V @ 1 mA) or wet-contact (0-30V). As outputs, the digital I/O ports 410 may provide sinking MOSFET outputs, rated 30V, 0.5 A. In an implementation, the digital I/O ports 410 may include two counter inputs with 0-30V, and up to 10 Hz (dry-contact) or up to 10 kHz (wet-contact). Various other implementations and specifications of the digital I/O ports 410 are contemplated.

In an implementation, the analog inputs may include four isolated channels with 0-12 V or 0-24 mA, with a 14-bit ADC resolution, with an accuracy of 0.1% FSR at 25 C, with ESD/EFT/Surge protection, and with an input resistance at 24 mA of 300 ohm. In an implementation, the analog outputs may include two isolated channels with 0-12 V or 0-24 mA, with a 16-bit resolution, with an accuracy of +/−0.2% FSR at 25 C, with ESD/EFT/Surge protection, with a settling time of 5 μs, and with a load range of 1000 ohm (12V)-600 ohm (20 mA). Various other implementations and specifications of the analog I/O ports 414 are contemplated.

In an implementation, the power ports 412 and the controller device 150 may support 10-28 Vdc, and may have a maximum power draw of 10.8 W @ 12V without analog outputs, and 20 W @ 12V with analog inputs. Various other implementations and specifications of the power ports 412 and power characteristics of the controller device 150 are contemplated. In various embodiments, the controller device 150 may include a power supply internal to the housing 402, or external to the housing 402, which may provide power to the controller device 150.

In an implementation, the controller device 150 has general dimensions of 180 mm×118 mm×32 mm. In alternative implementations the controller device 150 may have different dimensions. In an implementation, the controller device 150 housing is rated IP67 under IEC standard 60529. In an implementation, the controller device 150 may be certified for hazardous locations Class 1, Division 2, Groups A, B, C, and D (as defined by the National Electric Code ("NEC") in Articles 500 to 506). In various implementations the controller device 150 may have other ratings, certifications, or classifications.

Figure 5:
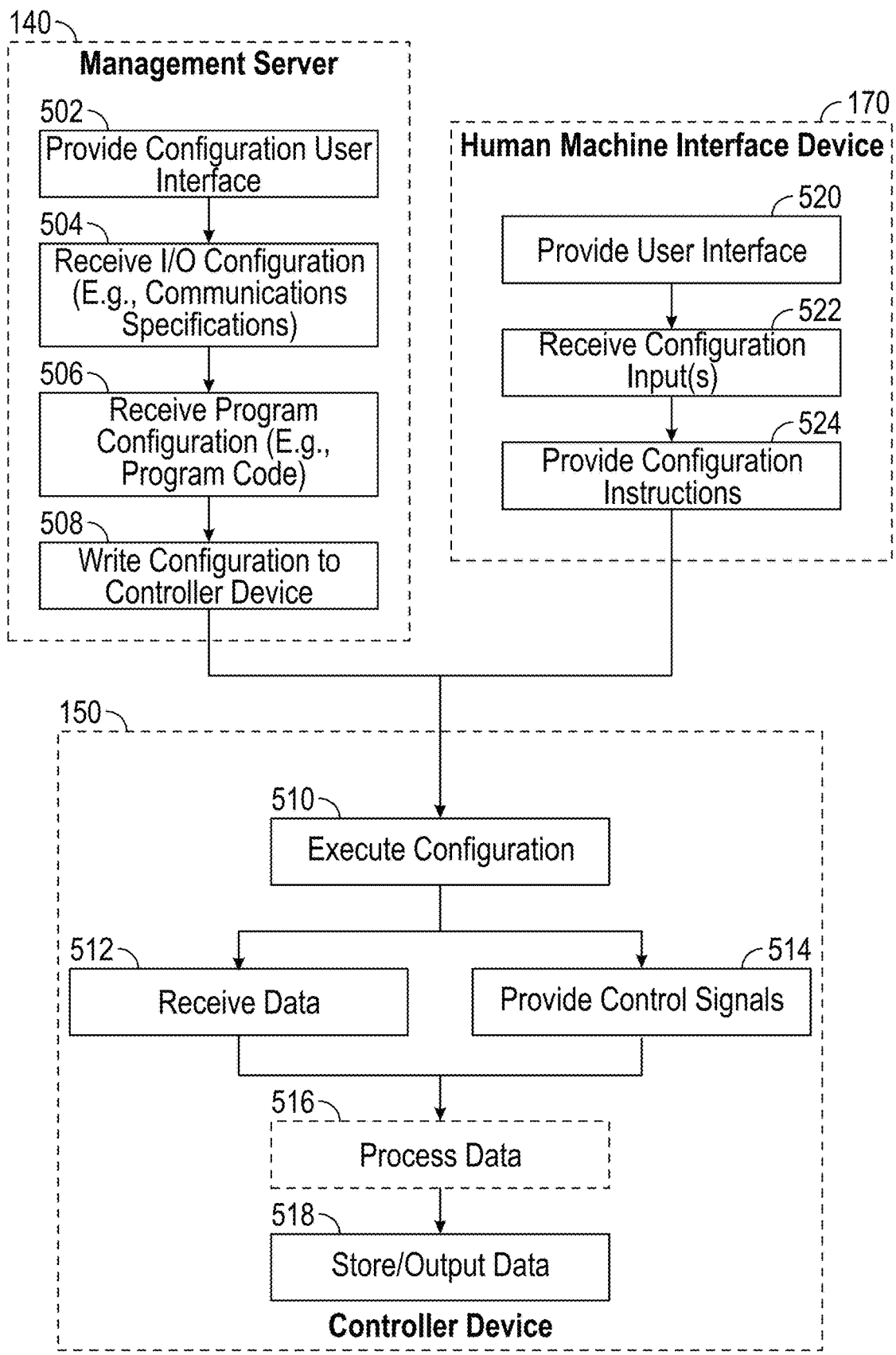
FIG. 5 is a flowchart illustrating example methods and functionality with respect to configuration and other features of the management server, the human machine interface device(s), and the controller device(s), according to various embodiments of the present disclosure.

IX. Example Methods and Functionality for System Configuration and Other Features FIG. 5 is a flowchart illustrating example methods and functionality with respect to configuration and other features of the management server 140, the human machine interface device(s) 170, and the controller device(s) 150, according to various embodiments of the present disclosure. FIG. 5 illustrates example functionality provided by, for example, the management server 140, the human machine interface device(s) 170, and the controller device(s) 150. Further, while FIG. 5 illustrates some communications between the management server 140, the human machine interface device(s) 170, and the controller device(s) 150 in certain directions, other communications between the management server 140, the human machine interface device(s) 170, and the controller device(s) 150 in other directions may occur as described herein. Further, the below description of the flowchart of FIG. 5 can be generally directed towards configuration and other features of the management server 140, the human machine interface device(s) 170, and the controller device(s) 150. Other communications and features of the management server 140, the human machine interface device(s) 170, and the controller device(s) 150 are contemplated in the present disclosure, such as the communications and features described in further detail below with respect to the flowchart of FIG. 11 regarding dynamically determining operations indicators.

At block 502, the management server 140 provides an interactive graphical user interface, which the user may access via user device(s) 120, for example, and by which the user may provide a configuration. The management server 140 may establish secure communications with the controller device 150 while providing the configuration user interface. In various implementations, ongoing secure communications may or may not be necessary, as portions of the configuration implementation may not require such ongoing communications.

At block 504, via the configuration user interface, the user may specify configuration/functionality of the input/output ports of the controller device 150 (e.g., communications specifications). Such communications specifications may enable the controller device 150 to communicate with various additional devices 180 via, e.g., the various communications interface(s) 324 of the controller device 150.

At block 506, via the configuration user interface, the user may specify executable program instructions, code, scripts, etc. to be executed by the controller device 150 as part of the configuration. Such program instructions may, for example, provide for analyses of received data/inputs to the controller device 150 (e.g., from additional device 180), and generation of outputs in response to those inputs. Such program instructions may further, for example, provide for determination of analysis results based on the received data/inputs. Examples of such inputs/outputs include, for example, trigger and/or sensor inputs, inputs/outputs to cause rejection of articles, outputs to machinery to speed up or slow down a manufacturing process, inputs/outputs to adjust a manufacturing process, inputs/outputs to actuate or operate a machine, inputs/outputs to execute a process, inputs/outputs to activate or deactivate a light or process, inputs/outputs to communicate with an automated process or device, inputs/outputs to communicate with a software program, etc.

At block 508, the management server 140 implements and/or duplicates the configuration to one or more controller device(s) 150. For example, the management server 140 may write the configuration to one or more controller devices 150 via wireless communication with the controller devices 150. Advantageously, the management server 140 may enable users to centrally access, copy, duplicate, modify, etc. configurations for multiple controller devices 150, making updating one or multiple controller devices 150 rapid and efficient.

In various embodiments, a configuration can additionally include information useable by the controller device 150 regarding local and remote storage of received data and analysis data, and/or the like.

Configurations may be implemented, and statuses of controller device(s) 150 may be monitored, via human machine interface device(s) 170. Accordingly, alternatively and/or in addition to blocks 502, 504, 506, and 508 described above in reference to functionality of the management server 140, at blocks 520, 522, and 524 the human machine interface device(s) 170 may provide functionality.

At block 520, the human machine interface device 170 may display an interactive graphical user interface related to monitoring status of the controller device(s) 150 and/or implementing configurations on the controller device(s) 150. As described herein, the controller device 150 may provide secure remote access, e.g., via a web server executing on the controller device 150 (e.g., by web server module(s) 336), to provide interactive HMIs and receive selections of configurations. At block 522, the human machine interface device 170 receives a user input selecting a configuration, and at block 524 the selection of the configuration is provided to, or received by, the controller device 150.

While blocks 520, 522, and 524 of example process of FIG. 5 focus on the example of the human machine interface device(s) 170, in various embodiments configurations may be received by the controller device(s) 150 from, e.g., the management server 140, human machine interface device(s) 170, and the user device(s) 120. In various embodiments, the interactive HMIs may comprise relatively streamlined interactive graphical user interfaces. For example, the interactive HMIs may comprise relatively few large buttons by which a user may select to stop a currently running configuration, may select a different configuration from a list (e.g., of configurations stored on the controller device 150), may search for a different configuration, and/or may monitor a current status of inputs/outputs, analyses, and/or the like. Examples of information that may be included in HMIs include substantially real-time current values of machine inputs, e.g., production count, power levels, value, progress bar, status light, on/off light, etc. Examples of additional buttons/functionality that may be included in HMIs include toggling an analog/digital I/O on/off, sending a Modbus signal or analog I/O signal, starting or stopping a production run, etc.

Via a human machine interface device 170 (and/or the management server 140 and/or user device(s) 120), a user may communicate with one or more controller device(s) 150 to, e.g., activate multiple devices (e.g., multiple additional devices 180), e.g., as part of a manufacturing process, industrial process or industrial monitoring process, and/or the like.

One or more configurations of the controller device 150 may be stored by the controller device 150 (e.g., in configuration data 334), and may further be synchronized with the management server 140 and/or the human machine interface device(s) 170. In various implementations, communication of configurations may be accomplished without the use of a web server.

In various implementations, the controller device 150 may provide, optionally via a web server, secure remote access to the controller device 150 by, e.g., the management server 140, the user device(s) 120, and/or the human machine interface device(s) 170. Via such access a user may, for example, monitor a status of the device, view a live data stream from the device, configure the device, and/or access received data and/or analysis data.

In various embodiments alerts may be sent to users based on, e.g., data analysis results. The management server 140 may provide such alerts to user device(s) 120. In some embodiments, the alert and/or notification is automatically transmitted to a device operated by the user and/or organization associated with a corresponding trigger. The alert and/or notification can be transmitted at the time that the alert and/or notification is generated or at some determined time after generation of the alert and/or notification. When received by the device, the alert and/or notification can cause the device to display the alert and/or notification via the activation of an application on the device (e.g., a browser, a mobile application, etc.). For example, receipt of the alert and/or notification may automatically activate an application on the device, such as a messaging application (e.g., SMS or MMS messaging application), a standalone application (e.g., productions line monitoring application), or a browser, for example, and display information included in the alert and/or notification. If the device is offline when the alert and/or notification is transmitted, the application may be automatically activated when the device is online such that the alert and/or notification is displayed. As another example, receipt of the alert and/or notification may cause a browser to open and be redirected to a login page generated by the system so that the user can log in to the system and view the alert and/or notification. Alternatively, the alert and/or notification may include a URL of a webpage (or other online information) associated with the alert and/or notification, such that when the device (e.g., a mobile device) receives the alert, a browser (or other application) is automatically activated and the URL included in the alert and/or notification is accessed via the Internet.

Referring again to FIG. 5, at block 510 the controller device 150 executes the received/selected configuration. Execution of the configuration includes, for example, implementation of the communications specifications and program code/instructions. Thus, at block 512, the controller device 150 may receive data/inputs from various additional device(s) 180, and at block 514, provide outputs/control signals to various additional device(s) 180. At block 516, the controller device 150 (e.g., by data processing module(s) 338) may process/analyze received data (according to the current configuration), and at block 518 received data, analysis data, and/or configurations may be locally stored and/or transmitted for remote storage.

In various embodiments, data analysis and/or decision making performed by controller device 150 (e.g., by the data processing module(s) 338) may include execution of deterministic and/or non-deterministic analysis algorithms. In some examples, the controller device 150 may use machine learning and/or artificial intelligence algorithms for detection of patterns in the received data. Accordingly, based on the data processing/analysis, the device may provide outputs, e.g., via communications interface(s) 324, that may be provided to any external device, e.g., additional device(s) 180. Examples of such outputs are described herein. Advantageously, providing outputs direct from the controller device 150 may eliminate the need for a separate PLC to, e.g., communicate with other devices/systems.

As mentioned above, the received data and analysis data (e.g., any and/or all information associated with the analysis/processing, including, e.g., features detected, decisions made, etc.) may be stored and/or logged by the controller device 150, e.g., in a memory/computer readable storage medium. In some implementations, the received data and analysis data may be stored indefinitely. In some implementations, the received data and analysis data may be stored for a period of time, e.g., rolling based on an acquisition date/time, and then deleted. In some implementations, the received data and analysis data may be stored or not stored, or stored for a period of time, based on an outcome/decision of the applicable processing/analysis. For example, data associated with positive outcome/events/determinations may be stored for a shorter period of time (or not at all), while data associated with adverse outcome/events/determinations may be stored for a longer period of time. In some implementations, storage of the received data and analysis data may be based on any combination of the above. In general, the analysis, processing, etc. of data may generally and broadly be referred to herein as "evaluation" of data.

As also mentioned above, advantageously, the controller device 150 may also offload received data and analysis data to the management server 140 (for storage and further analysis by the management server 140) via wired or wireless communications (e.g., via communications interface(s) 324). In some implementations, the received data and analysis data may be offloaded prior to deletion of such data on the controller device 150. In some implementations, the received data and analysis data may be offloaded in real-time or substantially real-time, or as long as communication with the management server 140 is available. In some implementations, the received data and analysis data may be offloaded periodically, in batches, and/or on demand. In some implementations, the received data and analysis data may be offloaded or not offloaded based on an outcome/decision of the applicable processing/analysis. In some implementations, the received data and analysis data may be offloaded based on and age of the received data and analysis data. In some implementations, the received data and analysis data may be offloaded or not offloaded based on network bandwidth availability, time of day (e.g., to preserve bandwidth during business hours), a threshold or cap on network bandwidth usage, and/or the like. In some implementations, offloading of the received data and analysis data may be based on any combination of the above.

In an implementation, a livestream of the received and/or analysis data (e.g., live operations data) may be provided to external devices. For example, a livestream may be provided via any suitable communications protocol, and one or more of a web-server module 336 or communications interface(s) 324, to user device(s) 120 (e.g., via any combination of network 130, local network 160, or management server 140). Accordingly, a user may access the livestream in an interactive graphical user interface provided on a user device 120. Advantageously, the livestream may be provided via a separate communications path/web server, to avoid the overhead and resulting reduced efficiency that may be incurred if a livestream was obtained further down the processing pipeline.

Further description related to the management server 140 receiving and aggregating data, and interactive graphical user interfaces related thereto, are described, e.g., in reference to FIGS. 6A-6F.

In various implementations, various aspects of the functionality described in reference to FIG. 5 may be accomplished in substantially real-time, e.g., received data may be processed as it is received. Alternatively, various aspects of the functionality described in reference to FIG. 5 may be accomplished in batches and/or in parallel.

X. Example Monitoring and Data Analysis Graphical User Interfaces

FIGS. 6A-6F illustrate example interactive graphical user interfaces related to monitoring and analysis of data from controller devices, according to various embodiments of the present disclosure. The interactive graphical user interfaces of FIGS. 6A-6F may be provided by the management server 140, and may be accessible via user device(s) 120. In general, received data and analysis data are automatically gathered from multiple controller devices 150 by the management server 140 (as described herein), and the received data and analysis data may then be further aggregated and analyzed to provide information and insights as described herein. Typically, the graphical user interfaces provided by the management server 140 are specific to an organization, and may include information from multiple controller devices 150 associated with the organization.

Figure 6A:
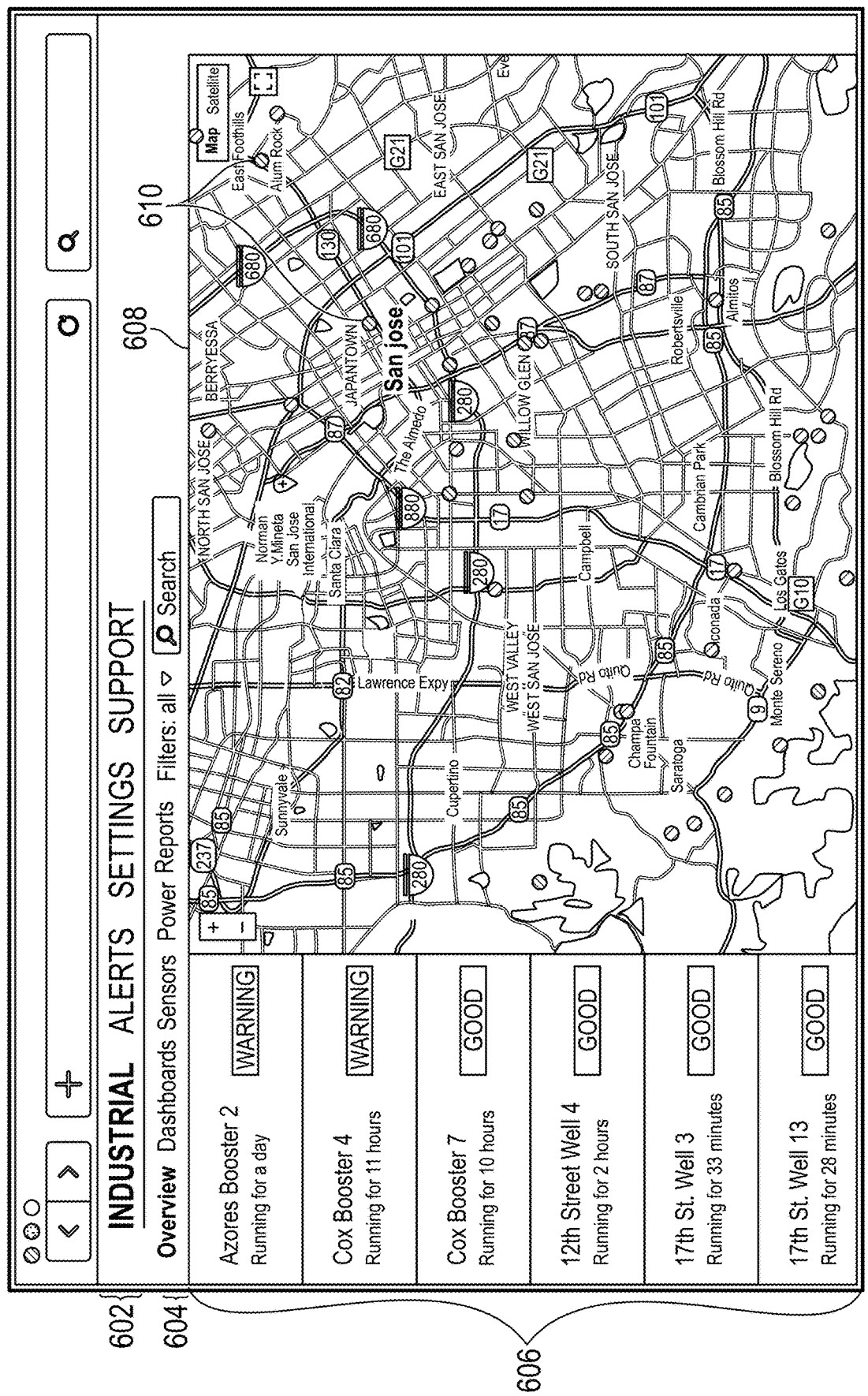
FIGS. 6A-6F illustrate example interactive graphical user interfaces related to monitoring industrial processes and analysis of data from controller devices, according to various embodiments of the present disclosure.

FIG. 6A includes selectable options 602 and 604 for accessing various pages, user interfaces, and aspects of the interactive graphical user interfaces provided by management server 140. FIG. 6A further includes a list 606 of controller devices (e.g., controller device(s) 150 in communication with the management server 140 or known by the management server 140, and associated with the current user and/or organization of the current user), and a map 608 with plotted points 610 indicating locations associated with each of the controller devices. In an implementation, each of the items of list 606 may indicate a combination of controller devices that, e.g., may be part of a same industrial process, manufacturing line, etc. The list 606 indicates a current status of each of the controller devices (e.g., "good", "warning", etc.), and an indication of an amount of time each controller device has been running in its current configuration. Each controller device is indicated by a name associated with the controller devices as stored by the management server 140 and/or the controller device(s) 150. The user may select points 610 on the map 608, and/or items from the list 606, to access further details. In an implementation, the points 610 are colored based on a status of the associated controller device(s) 150.

Figure 6B:
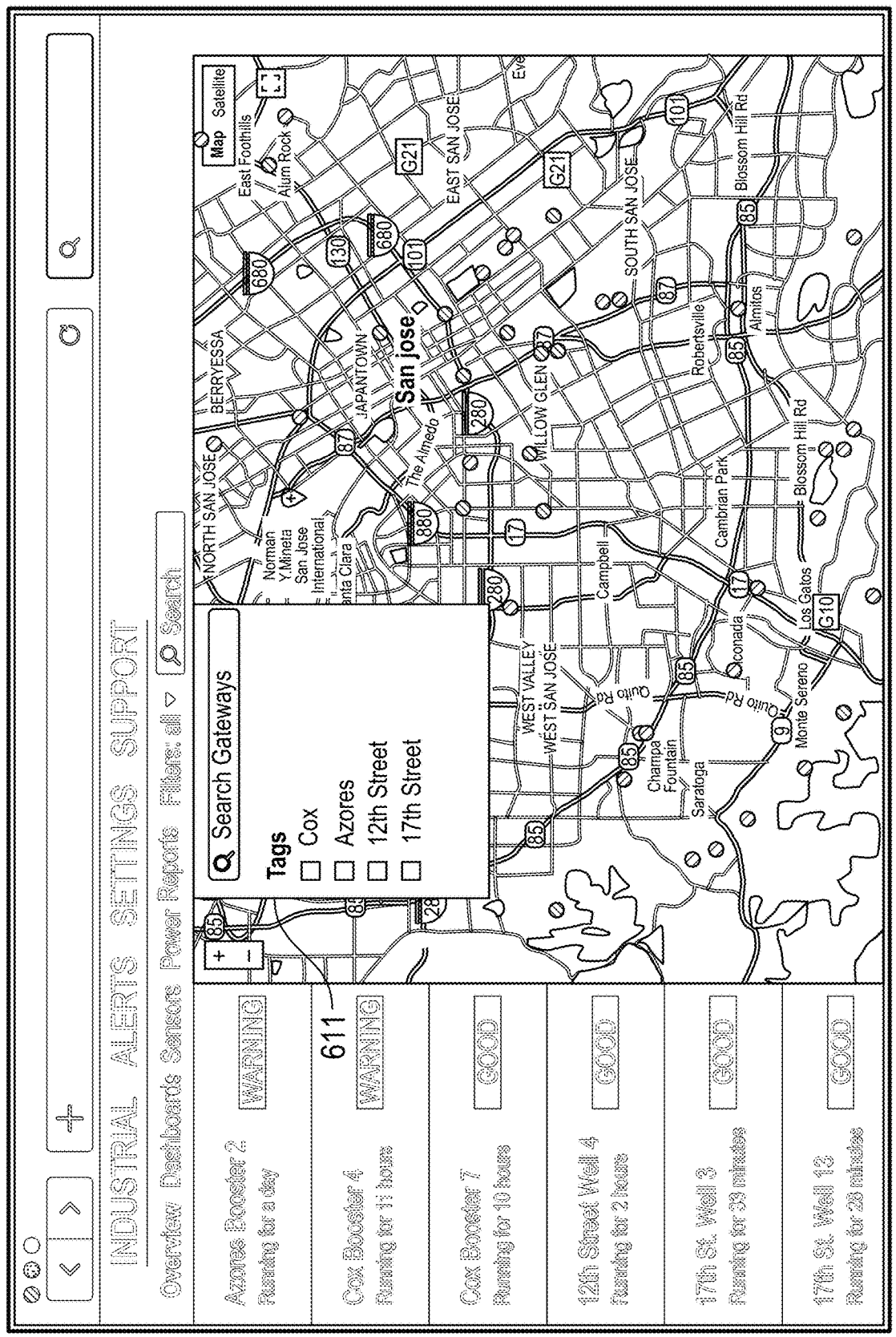
Figure 6C:
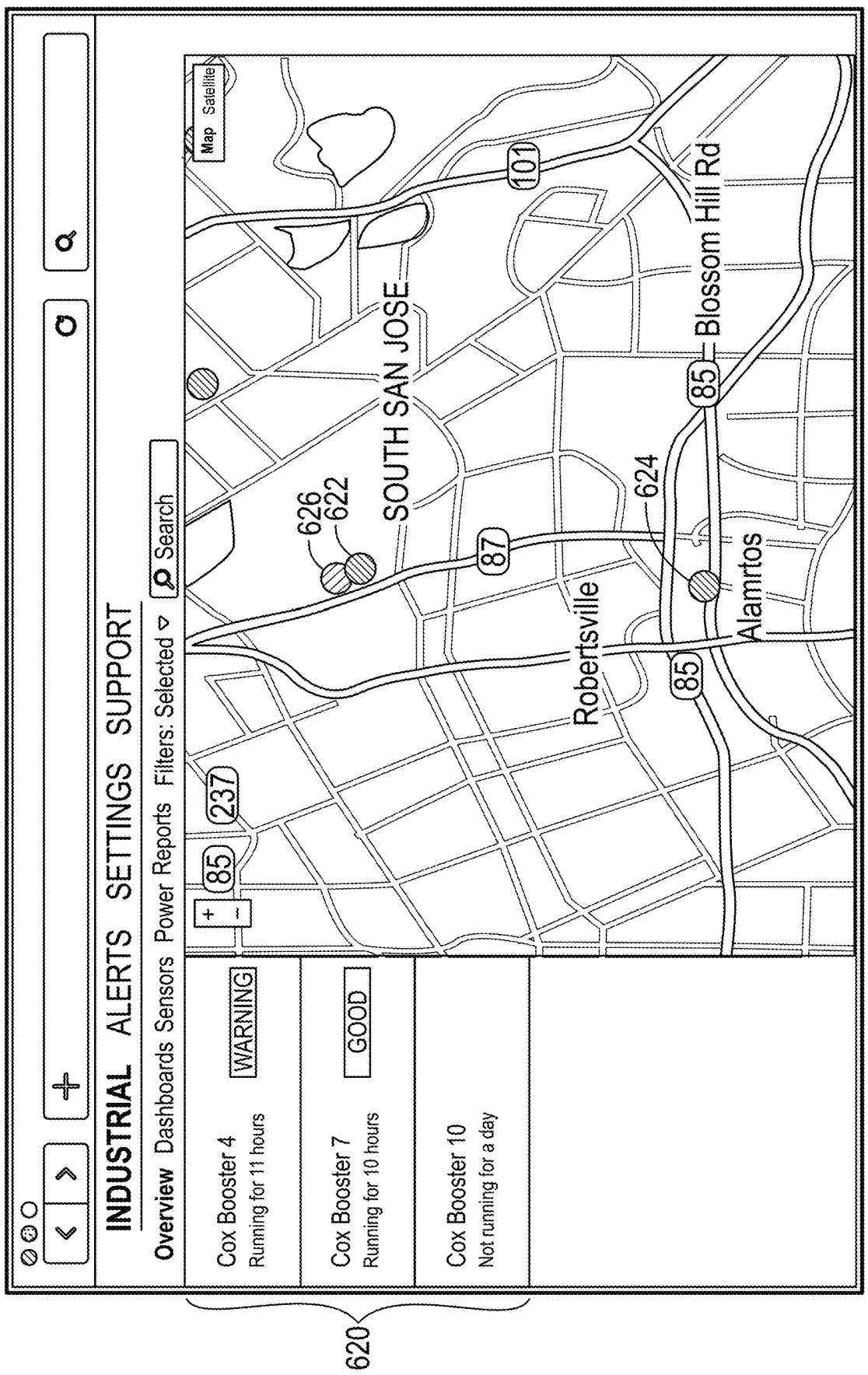

FIG. 6B illustrates that the user may use a filter/search box 611 to filter the controller device(s) 150. FIG. 6C illustrates the results of the user filtering to controller device(s) 150 tagged "cox." As shown, a filtered list 620 is now shown, and associated points 622, 624, and 626 are shown in the map (wherein the map has automatically been zoomed based on the filtered controller devices).

Figure 6D:
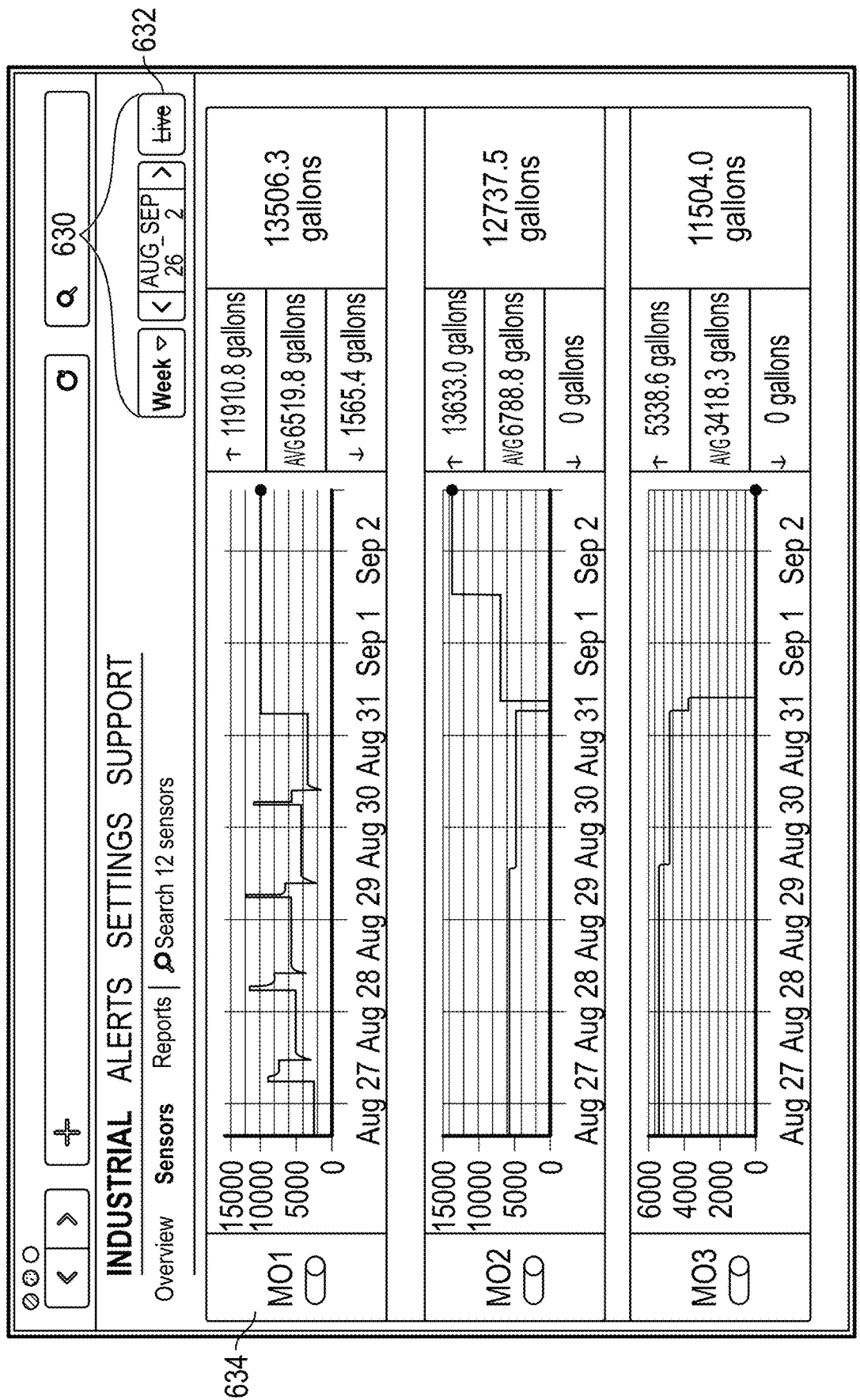

FIG. 6D illustrates an interactive graphical user interface that may be displayed when the user selects to view details related to a specific controller device (or group of controller devices controller device 150 (e.g., via selection of one of the listed items or plotted points of FIGS. 6A-6C). The graphical user interface of FIG. 6D includes separate portions associated with each, e.g., additional device 180 providing data to, and/or being controlled by, the selected controller device 150. Portion 634 shows an additional device 180 labeled MO1, including a chart of data received from the additional device 180, and various calculated information related thereto. At 630 the user can select a particular date range of interest, and may select how the data associated the additional device(s) 180 should be aggregated (e.g., day, week, month, etc.). At 632 the user may determine whether the displayed data is live data, and may select to view live, constantly updated data being received from the related controller device(s) 150.

In various implementations, additional device(s) 180 and controller device(s) 150 may be partitioned or grouped in different ways, and aggregated data associated with these devices may be displayed and interacted with by a user. The aggregated data may be partitioned or grouped based on identifiers associated with the controller device(s) 150 and additional device(s) 180, and/or they may be grouped based on configurations, locations, programs, industrial processes, etc. Accordingly, the user may rapidly obtain an overview of the status of many controller device(s) 150 (and associated additional device(s) 180) simultaneously. Further aggregated information that may be provided in interactive graphical user interfaces of the management server 140 may include various analytics.

Advantageously, the present devices and systems, according to various embodiments, may be used to track and analyze data from various types of industrial processes and calculated various metrics (e.g., track flow, pressure, tank levels, power usage; calculate efficiencies; control oil and gas flows; determine machine heath, downtime, metrics, etc.).

Figure 6E:
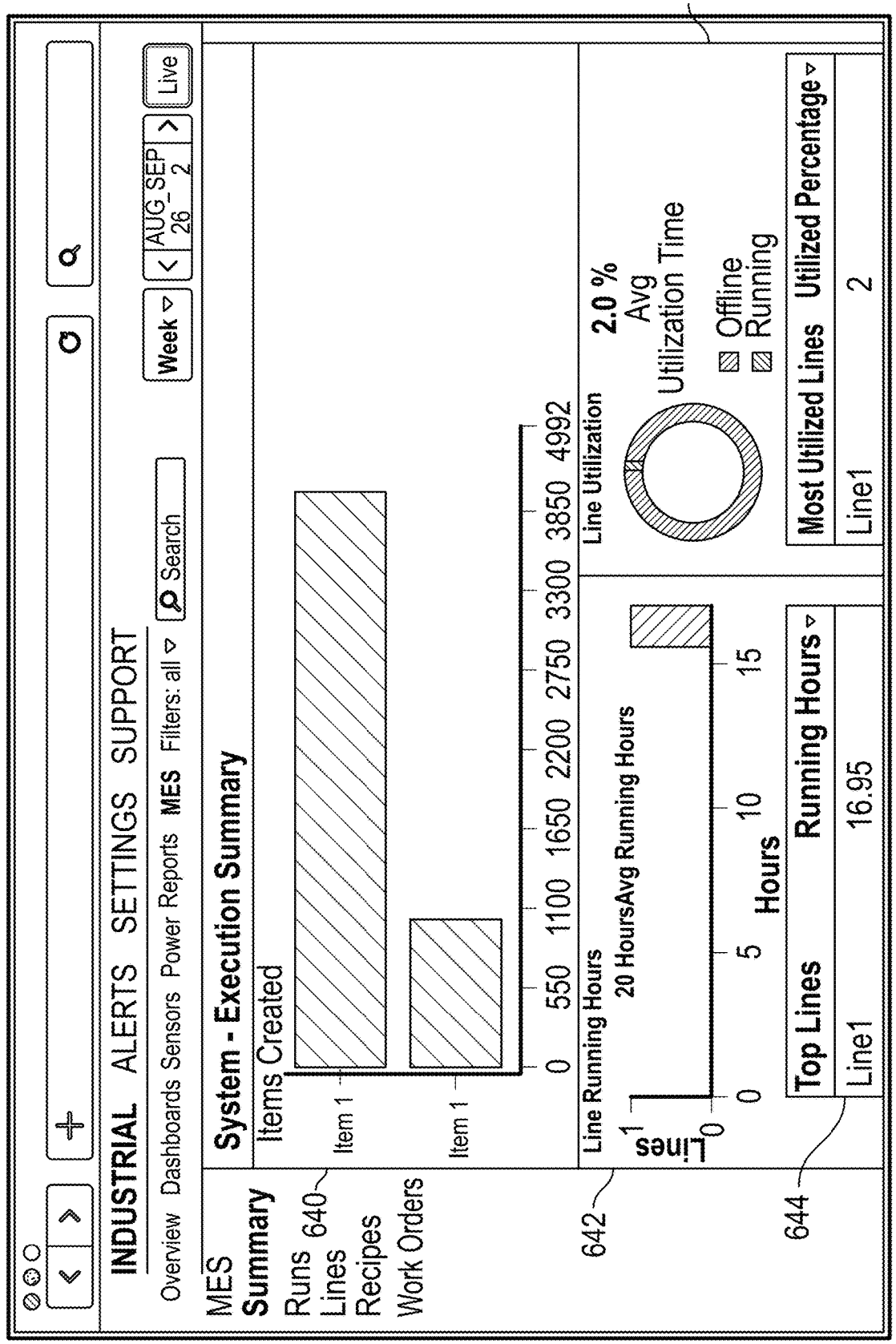

FIG. 6E illustrates an example interactive graphical user interface that includes aggregated data related to a particular Manufacturing Execution System ("MES"). The information provided via the example graphical user interface of FIG. 6A may be aggregated by the management server 140 from one or more controller device(s) 150, and may include, for example, a summary chart 640 of items created of various types, information 642 and 644 on line running hours, and information 646 on line utilization.

Figure 6F:
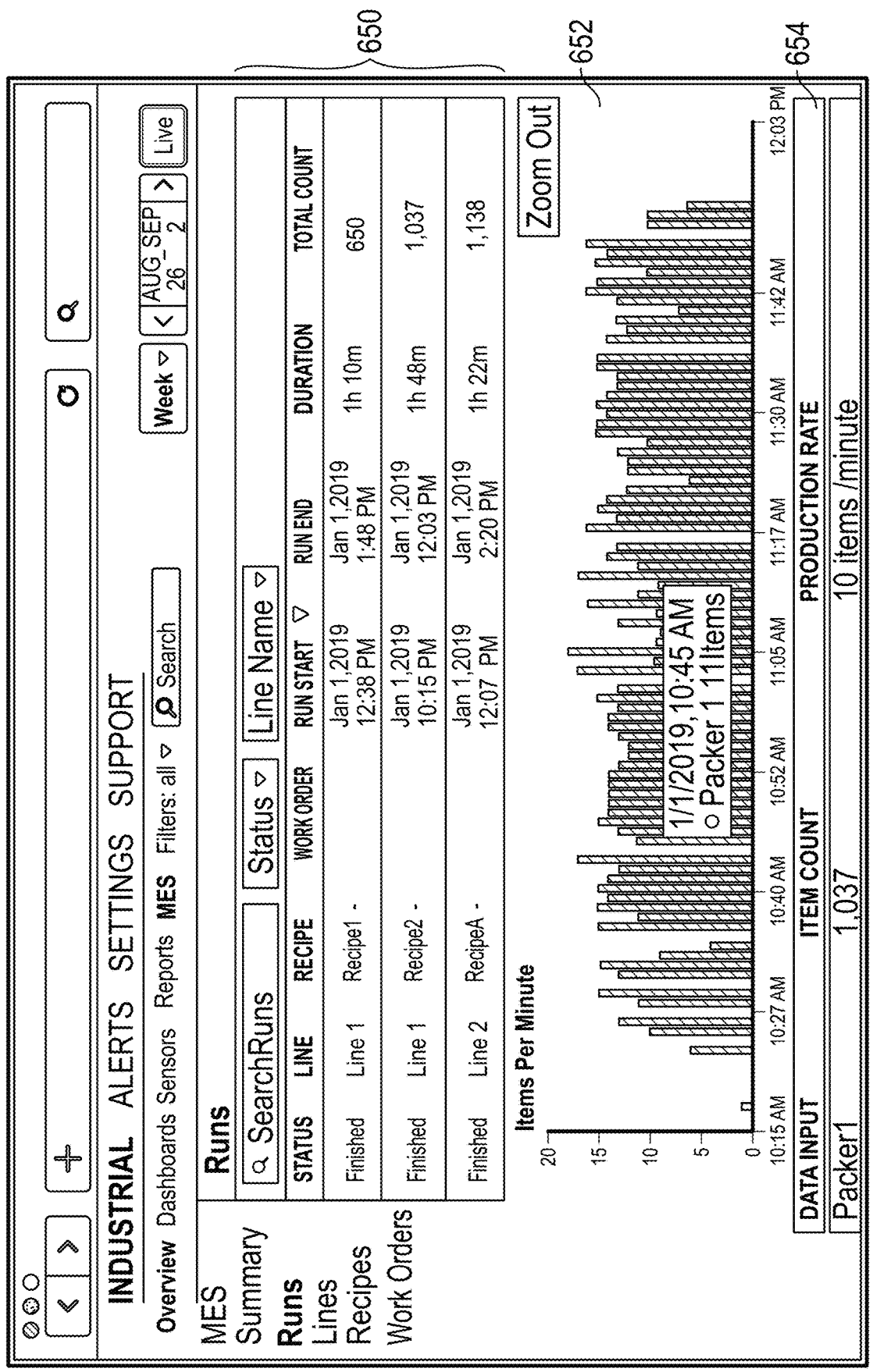

FIG. 6F illustrates an example interactive graphical user interface in which the user has drilled down to view specific runs on the MES, and can view information 650 related to the various runs, and an interactive chart 652 and table 654 related to the same.

XI. Example Graphical User Interfaces for Human Machine Interface ("HMI") Devices FIGS. 7A-7G illustrate example interactive graphical user interfaces related to event reporting via human machine interface ("HMI") devices, according to various embodiments of the present disclosure. The interactive graphical user interfaces of FIGS. 7A-7G may be provided by the controller device 150, and may be accessible via the human machine interface devices 170. In general, received data and analysis data are automatically gathered from multiple controller devices 150 by the management server 140 (as described herein), and the received data and analysis data may then be further aggregated and analyzed to provide information and insights as described herein.

Figure 7A:
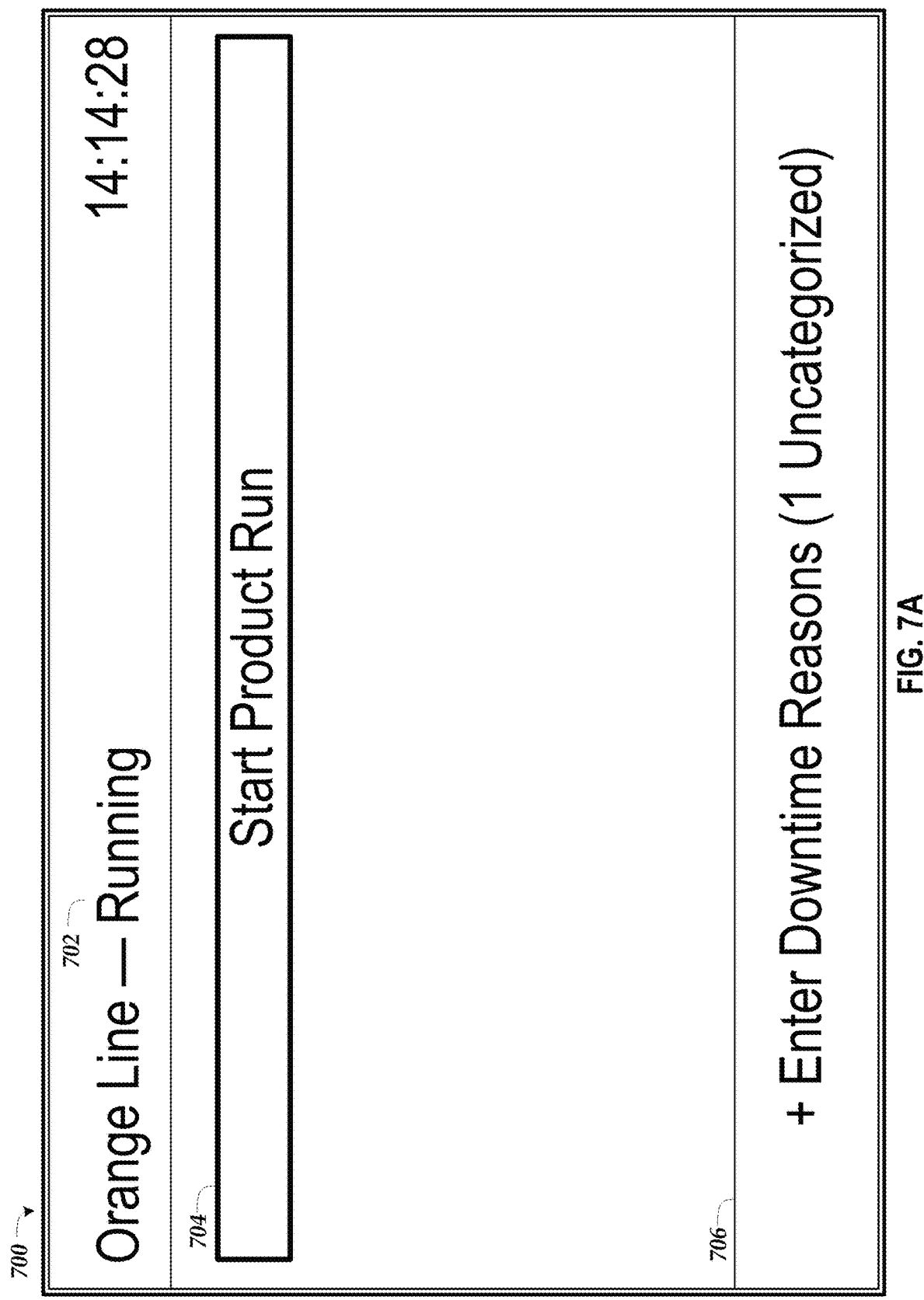

FIG. 7A illustrates an example operator user interface 700. The operator user interface 700 can be presented on the human machine interface device 170, such as a tablet, and used by an operator on, for example, a manufacturing line. The operator user interface 700 can indicate the status of a particular line with a status indicator 702. Example status indicators can include, but are not limited to, textual indicators (such as "Running" or "Stopped"). The operator user interface 700 can include a downtime element 706 and a run element 704. An operator on the line can use the operator user interface 700 to input downtime information. For example, a controller device 150 can detect downtime on the line and an operator can categorize a downtime event with the operator user interface 700, such as by initially selecting the downtime element 706.

Figure 7B:
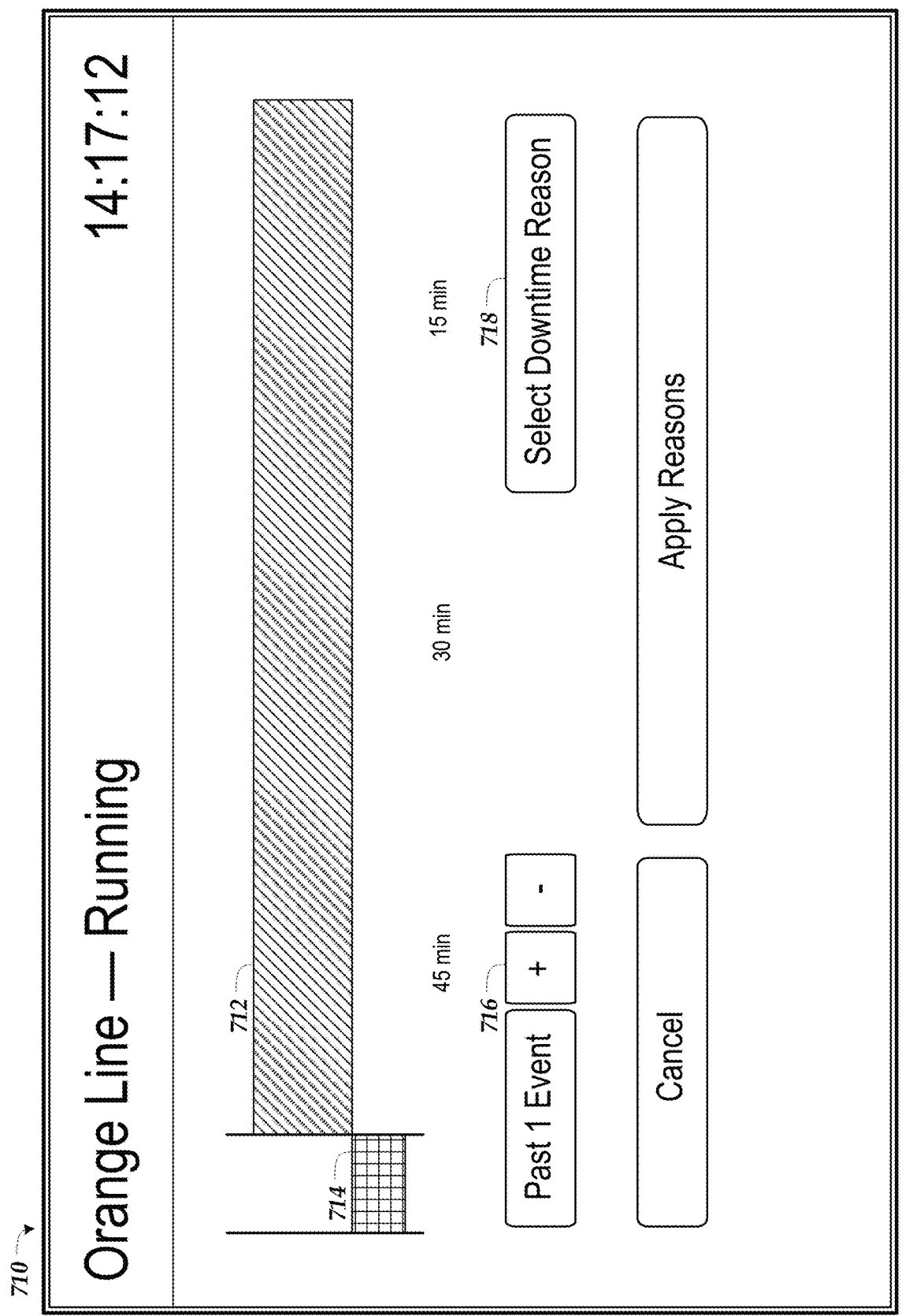

FIG. 7B illustrates another example operator user interface 710. The operator user interface 710 can include timeline 712, an event selector 716, and another downtime element 718. As described above, a user can select the downtime element 706 of the initial user interface 700 of FIG. 7B to result in the user interface 710 for entering downtime information. The operator can use the event selector 716 to select one or more events to apply a downtime metadata, such as a downtime reason. A portion of the timeline 712 can indicate uptime and another portion 714 of the timeline 712 can indicate a downtime event that can be selected. While not shown, the timeline 712 can include multiple downtime events and operator can select several of the downtime events with the event selector 716. An operator can begin selecting the type of downtime events by selecting the downtime element 718.

Figure 7D:
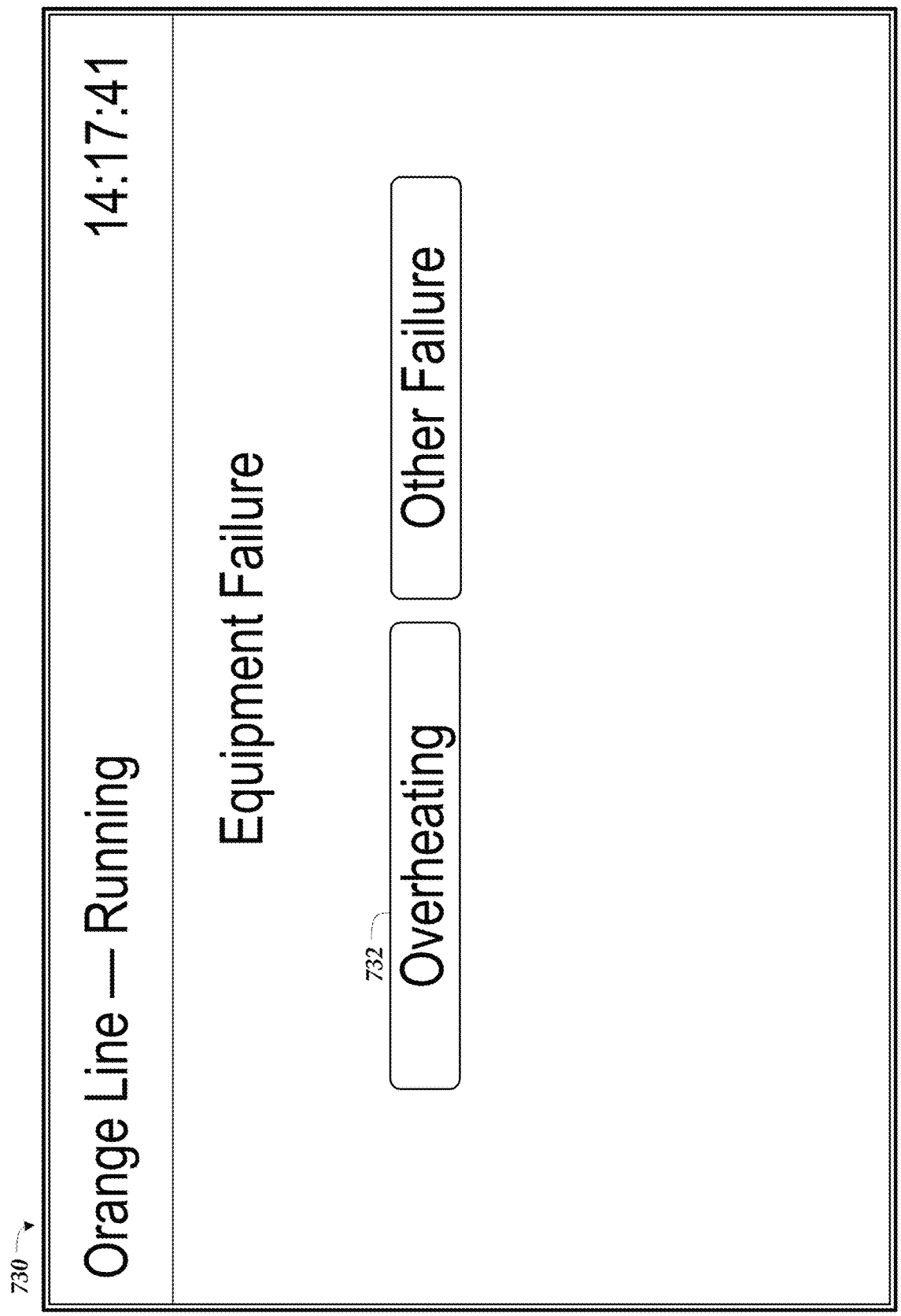

FIG. 7C illustrates yet another example operator user interface 720. The operator user interface 720 can include downtime event types 722 for selection by an operator. In some embodiments, the downtime event types 722 can be planned or unplanned. Example unplanned downtime event types include a power failure or a type of malfunction. Example planned downtime event types can include a lunch break or other particular types of planned shutdowns, such as a shutdown for scheduled maintenance. As shown, the downtime event types 722 can be hierarchical. For example, a parent downtime event type (such as "Equipment Failure") can have children downtime event types, which are described below with respect to FIG. 7D. FIG. 7D illustrates an example operator user interface 730 with a children downtime event type 732 that an operator can select. Upon selection, the controller device 150 and/or the management server 140 can receive the downtime event.

Figure 7E:
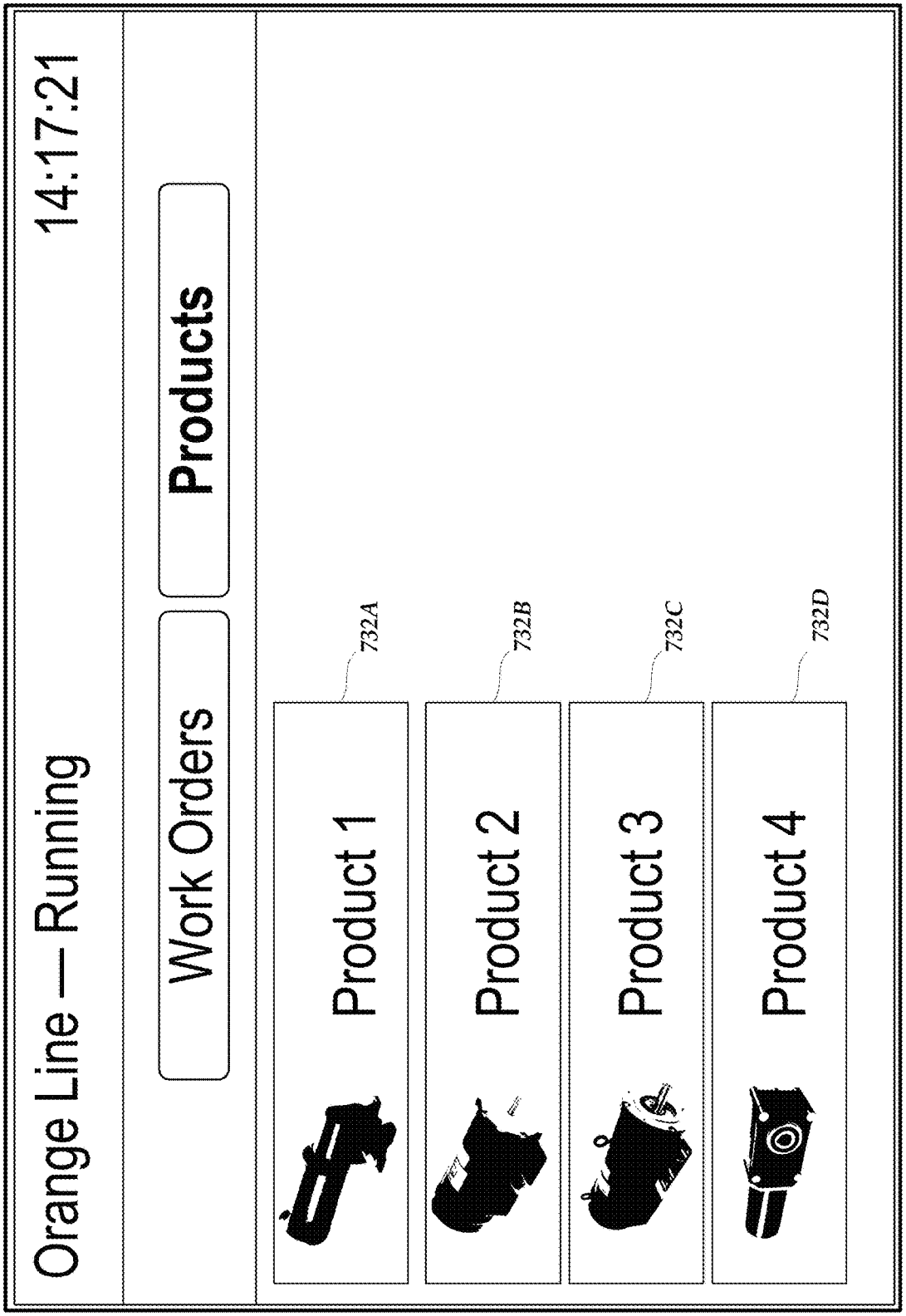
Figure 7F:
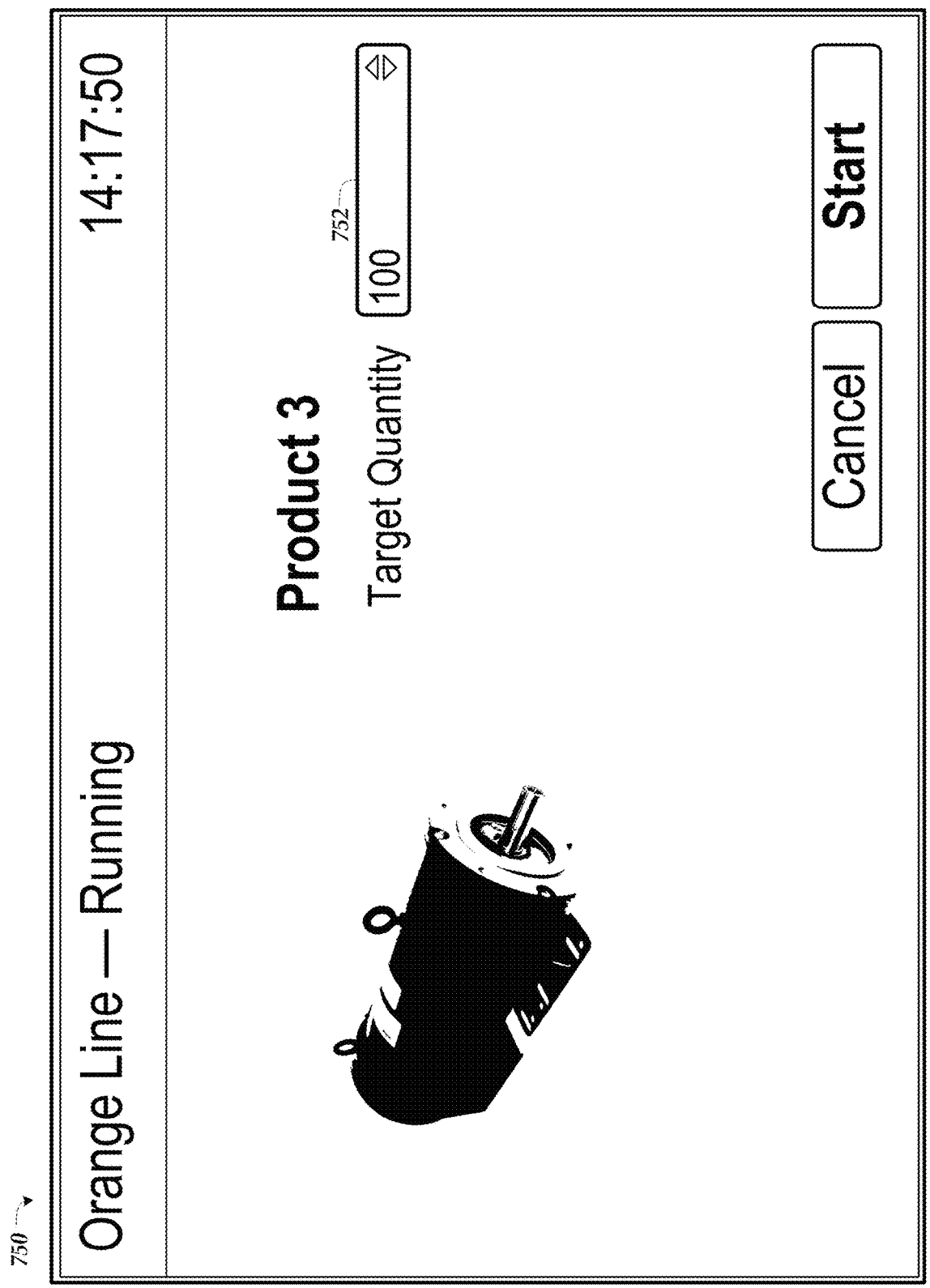

Returning to FIG. 7A, the run element 704 can be used by the operator to initiate a run configuration process, which is described in further detail with respect to FIG. 7E. FIG. 7E illustrates an example operator user interface 740 for configuring a run. As part of the run configuration process, an operator can select an item type from the item types 732A, 732B, 732C, 732D (here "Product 1," "Product 2," "Product 3," and "Product 4") in the operator user interface 740. An operator can also select an output configuration, such as a work order, which is described in further detail below with respect to FIG. 10. FIG. 7F illustrates another example operator user interface 740 for configuring a run. Following selection of an item type (such as "Product 3"), an operator can select a target quantity with the target quantity selector 752 from the operator user interface 740. With the run information inputted, an operator can start the run with the operator user interface 740. In some embodiments, the management server 140 can use the run configuration information provided by the operator to determine operations indicators as described herein.

Figure 7G:
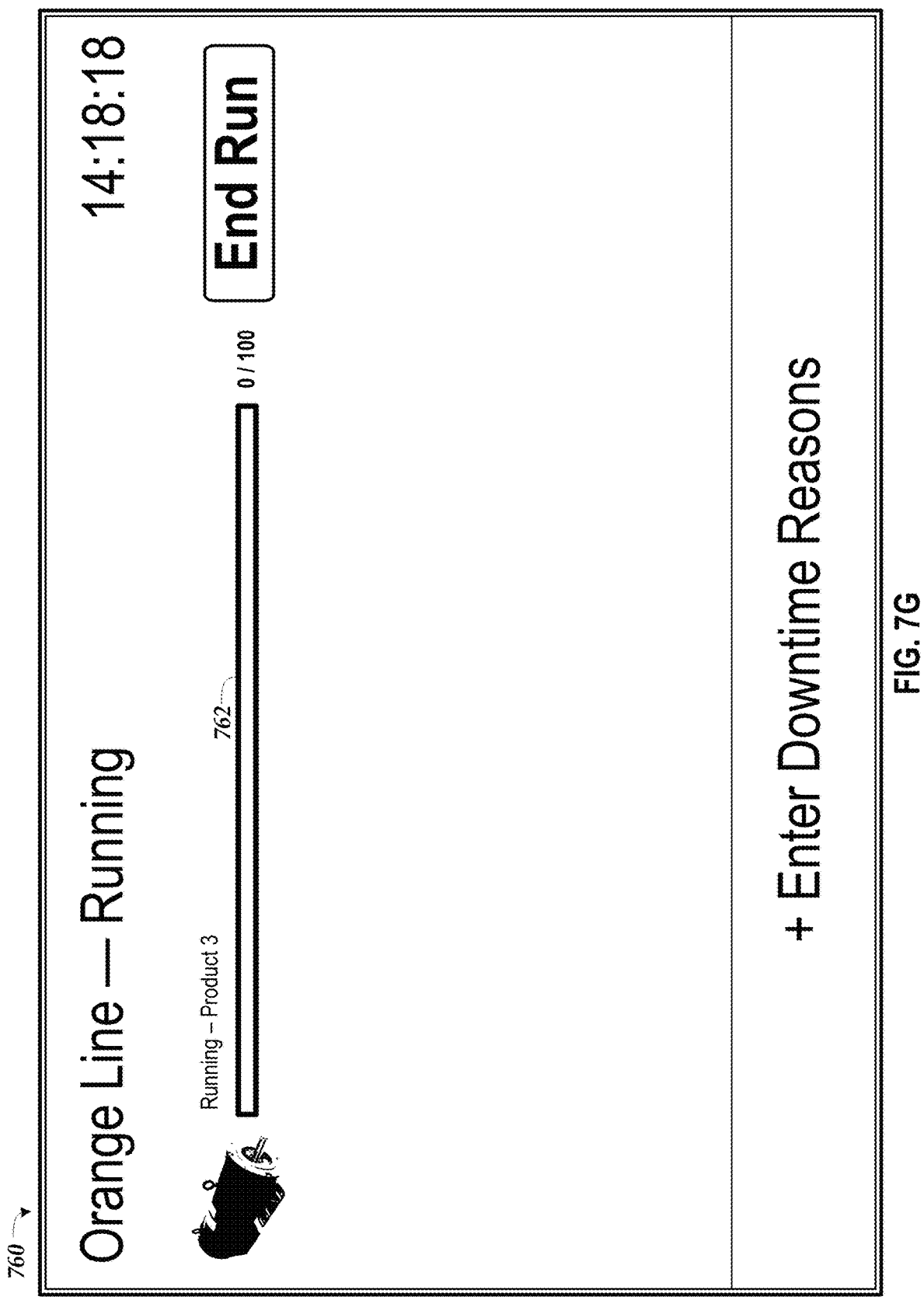

FIG. 7G illustrates yet another example operator user interface 760. The operator user interface 760 can provide a summary view of a run. For example, the operator user interface can present the item count element 762 to indicate the number of items completed or processes through the product run associated with FIGS. 7A-7G. The item count element 762 can dynamically update as the number of items associated with the run changes. For example, as more items care completed by the run, the item count element 762 can visually indicate an increase in completed items.

XII. Example Data Analysis Graphical User Interfaces

FIGS. 8A-8I illustrate example interactive graphical user interfaces related to analysis of data from controller devices, according to various embodiments of the present disclosure. The interactive graphical user interfaces of FIGS. 8A-8I may be provided by the management server 140, and may be accessible via the user device(s) 120. In general, received data and analysis data are automatically gathered from multiple controller devices 150 by the management server 140 (as described herein), and the received data and analysis data may then be further aggregated and analyzed to provide information and insights as described herein. Typically, the graphical user interfaces provided by the management server 140 are specific to an organization, and may include information from multiple controller devices 150 associated with the organization.

Figure 8A:
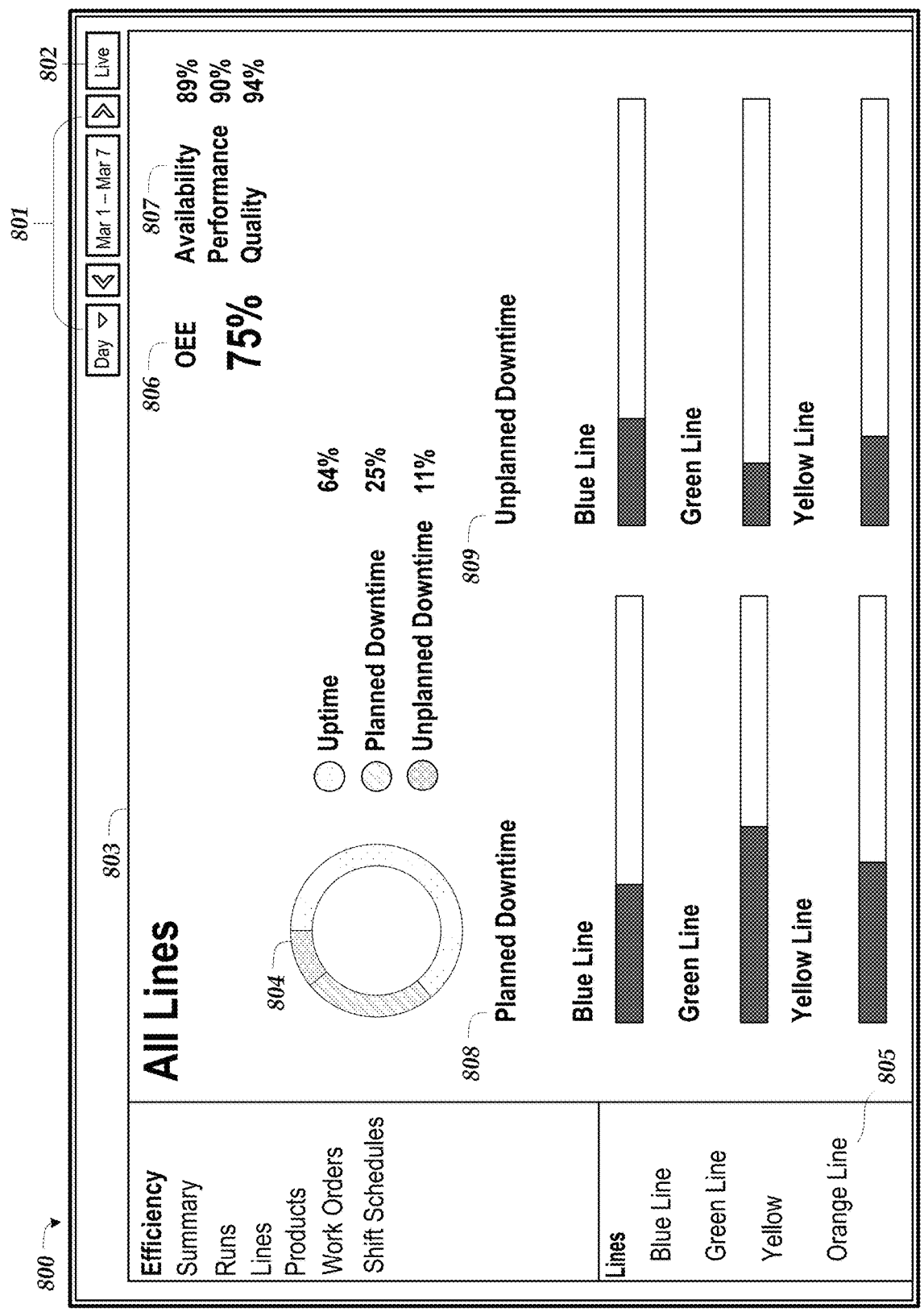
FIGS. 8A-8I illustrate example interactive graphical user interfaces related to analysis of data from controller devices, according to various embodiments of the present disclosure.

FIG. 8A illustrates an example efficiency summary user interface 800. The efficiency summary user interface 800 can be used by an analyst to review operation indicators, such as efficiency indicators, for multiple lines. Similar to previous user interfaces, the efficiency summary user interface 800 can include a date range selector 801 and a live element 802. Using the date range selector 801, a user can select the time range (e.g., day, week, range of days, month, etc.) for the aggregated data. A user can also select the live element 802 to view live, constantly updated data in the efficiency summary user interface 800. Thus, if new uptime or downtime events are received, the efficiency summary user interface 800 can update accordingly.

As shown, the efficiency summary user interface 800 can include an efficiency summary area 803. The efficiency summary area 803 can include operations visualizations 804, 808, 809 and aggregated operations indicators 806, 807. The first operations visualization 804 can visually present availability-related data, such as a breakdown of uptime, planned downtime, and unplanned downtime. The availability-related data can be from multiple lines. In some embodiments, the system does not count planned downtime against availability. In the example, uptime is 64%, planned downtime is 25%, and unplanned downtime is 11%; thus, in some embodiments, the availability may be 89% because the 25% planned downtime does not count against availability. In some embodiments, some types of planned downtime can count against availability where the planned downtime satisfies some conditional logic, such as the planned downtime exceeding a time limit. The remaining visualizations 808, 809 can visually present planned and unplanned downtime at respective lines that make up the aggregated data.

The aggregated operations indicators 806, 807 can be aggregated indicators for multiple lines. The first operations indicator 806 can be an overall equipment effectiveness ("OEE") indicator for multiple lines. The first operations indicator 806 can be a percentage (here 75%). The first operations indicator 806 can be based on the second operations indicators 807. Examples of the second operations indicators 807 can include availability, performance, and quality indicators for multiple lines. The first operations indicator 806 can be a combination of the second operations indicators 807 (e.g., availability, performance, and quality). An example combination operation to determine the first operations indicator 806 can be a multiplication operation of the second operations indicators 807. For example, the first operations indicator 806 can be defined by the following relationship: availability (89%)*performance (90%)*quality (94%).

As described, the efficiency summary user interface 800 can present aggregated data for multiple lines. The efficiency summary user interface 800 can further include an option for a user to analyze an individual line from the multiple lines. For example, a user can select the line option 805 to view operations data associated with the particular line (here the "Orange Line").

Figure 8B:
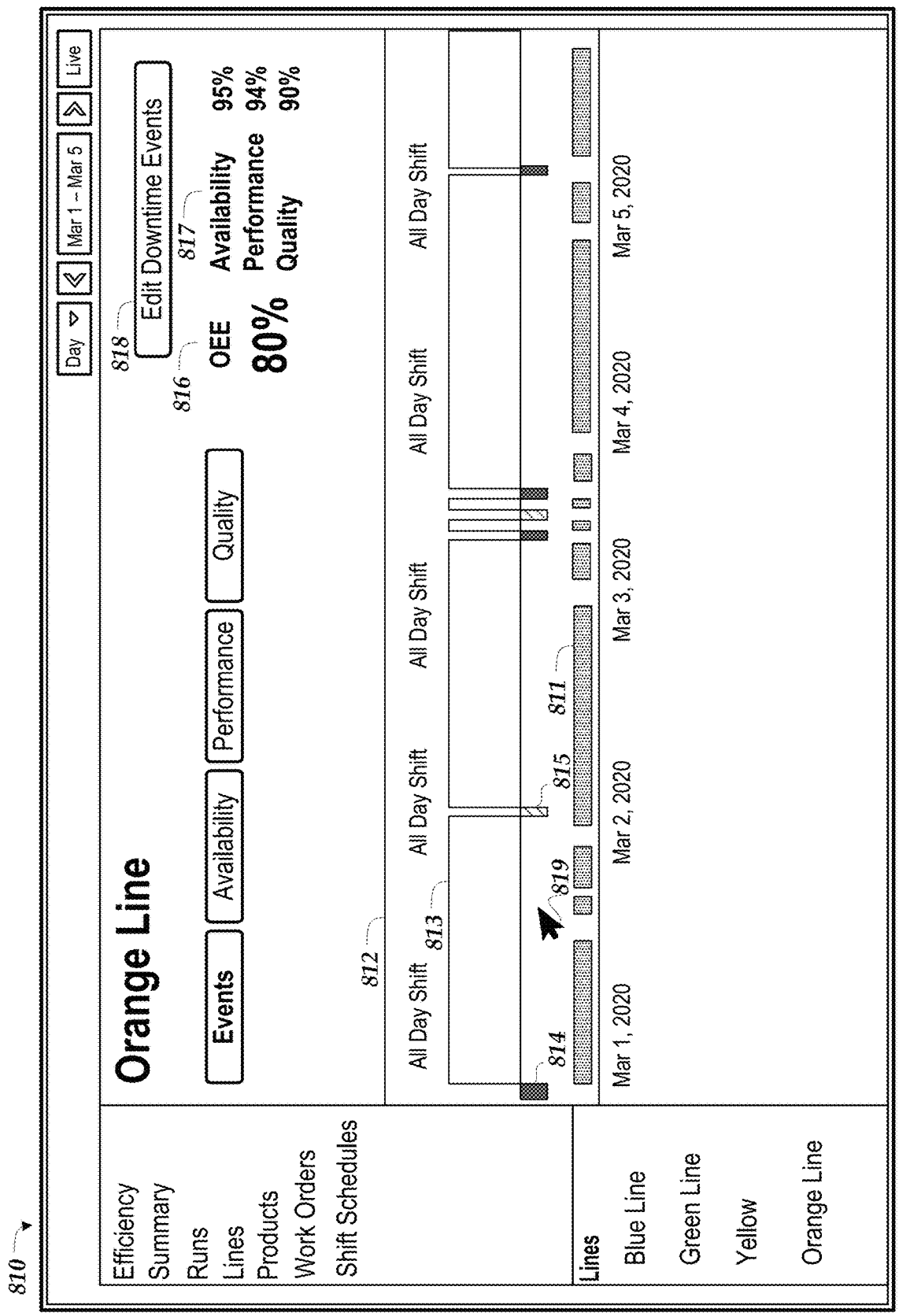

FIG. 8B illustrates an example events user interface 810. The events user interface 810 can be used by an analyst to review events associated with a particular line (here the "Orange Line"), which can affect operations indicators for the line. The events user interface 810 can include an operations time visualization 812. The example operations time visualization 812 is configured to present events and even-related data associated with a particular line. The example operations time visualization 812 is configured to present a timeline that visually indicates uptime 813, downtime events 814, 815 (e.g., planned or unplanned downtime events), and output 811 (such as number of units produced) from a particular line. The events and even-related data (such as uptime, downtime events, and output) can be received from the controller devices 150. Moreover, as described herein, at least some of the events and even-related data (such as the downtime events and metadata) can be received via operator user input from the human machine interface device 170. For example, the events within the events user interface 810 can include the events that are submitted via operator user interfaces, which are described in further detail above with respect to FIGS. 7A-7D.

The operations indicators 816, 817 can be for the particular line (here the "Orange Line"). The first operations indicator 816 can be an overall equipment effectiveness ("OEE") indicator for the particular line. The first operations indicator 816 can be a percentage (here 80%). The first operations indicator 816 can be based on the second operations indicators 817 for the particular line. Examples of the second operations indicators 817 can include availability, performance, and quality indicators for the particular line. The first operations indicator 816 can be a combination of the second operations indicators 817 (e.g., availability, performance, and quality) for the particular line. An example combination operation to determine the first operations indicator 816 can be a multiplication operation of the second operations indicators 817 for the particular line. For example, the first operations indicator 816 can be defined by the following relationship: availability (95%)*performance (94%)*quality (90%).

The events user interface 810 can include an edit events element 818. A user selection of the edit events element 818 can enable an analyst to edit events, such as downtime events. Similar to the operator user interfaces described above with respect to FIGS. 7A-7D for submitting events, an analyst can edit downtime events by changing the downtime reasons/event types, for example. The events user interface 810 can further include a selector 819 and/or some other mechanism for selecting a portion of the operations time visualization 812 (such as touch user input). One function of the selector 819 or related mechanism can be to allow the analyst to select a subset of the operations time visualization 812, such as by selecting a start and end point on the timeline. The user selection of the operations time visualization 812 can cause the events user interface 810 to dynamically update.

Figure 8C:
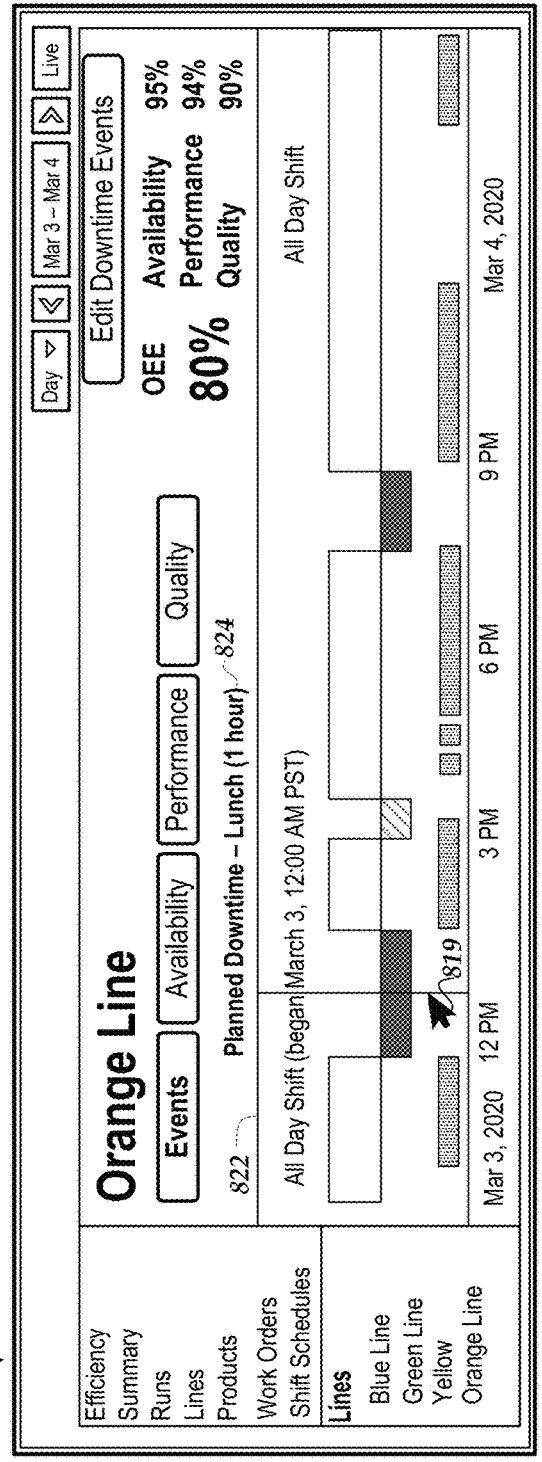
Figure 8D:
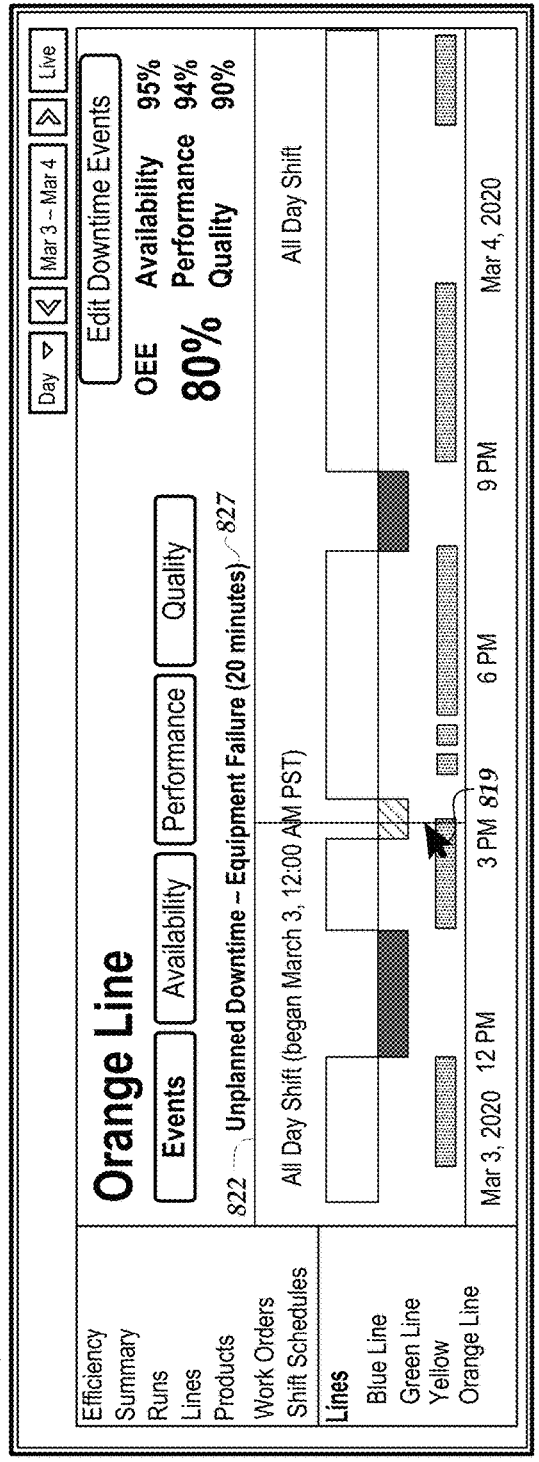

Turning to FIGS. 8C and 8D, each figure illustrates example interactions with the respective events user interface 820, 825. For example, unlike the date range of the operations time visualization 812 of FIG. 8B, the date range of the operations time visualization 822 of FIGS. 8B, 8C can be different based on a previous user selection of a start and end point on the timeline. In FIG. 8C, the operations time visualization 822 can be interactive in that a selection of a downtime event (as shown) on the timeline can cause the presentation of a corresponding event type 824. As shown, the first event type 824 can be a planned downtime lunch event type. Similarly, in FIG. 8D, a selection of a different downtime event (as shown) on the timeline can cause the presentation of a different corresponding event type 827 (here an unplanned downtime equipment failure event type). Accordingly, the events user interfaces 820, 825 can be dynamic and allow an analyst to access information in an easier and more efficient manner than previous systems.

Figure 8E:
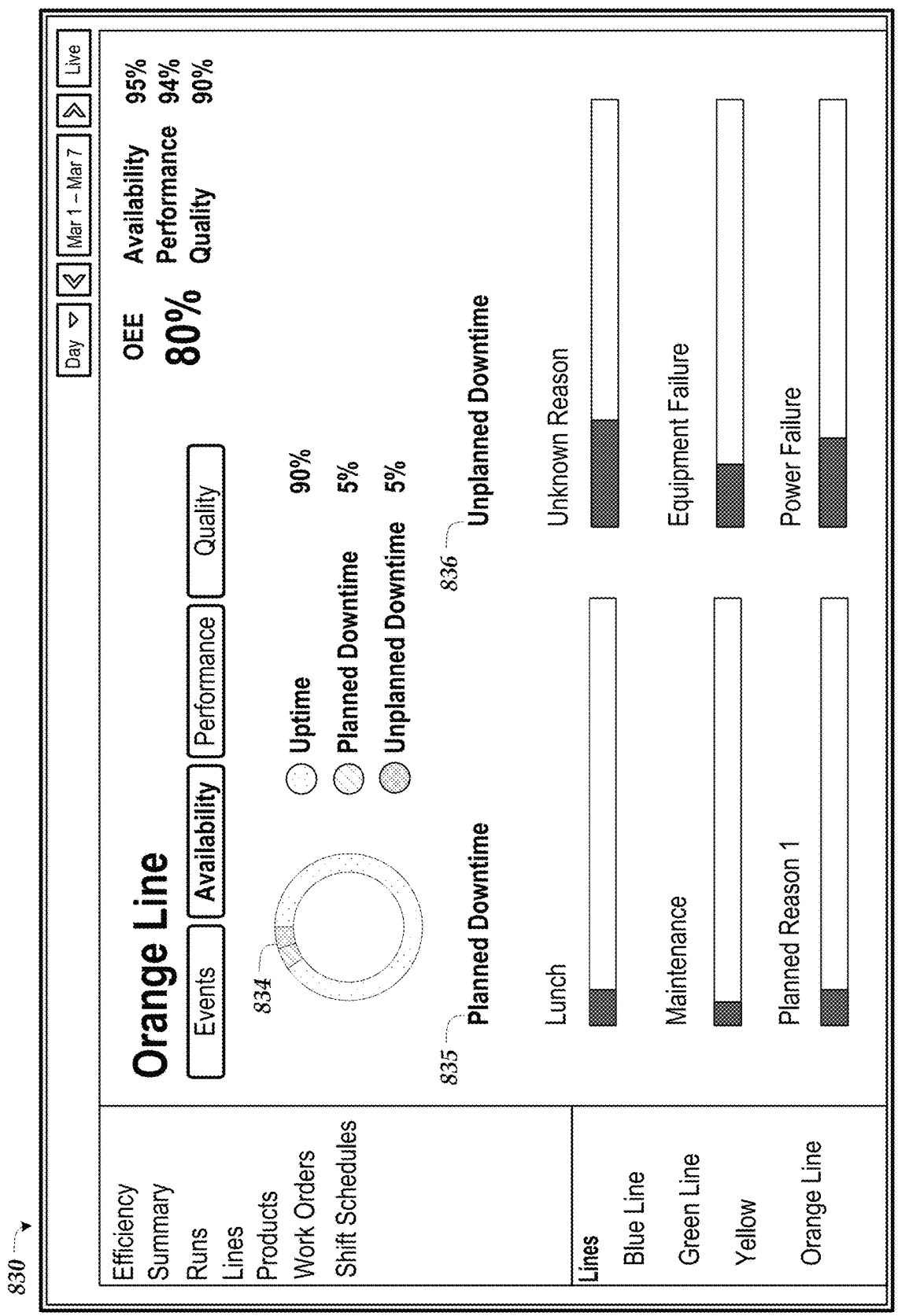

FIG. 8E illustrates an example availability user interface 830. The availability user interface 830 can include operations visualizations 834, 835, 836. The first operations visualization 834 can visually present availability-related data, such as a breakdown of uptime, planned downtime, and unplanned downtime for a particular line. The first operations visualization 834 of FIG. 8E can be similar to the first operations visualization 804 described above with respect to FIG. 8A. In this example, uptime is 90%, planned downtime is 5%, and unplanned downtime is 5%; thus, as described herein, the availability may be 95% because the 5% planned downtime does not count against availability for the particular line. The remaining visualizations 835, 836 can visually present planned and unplanned downtime at respective lines that make up the aggregated data. In particular, the visualizations 835, 836 can visually present an individual indicator or visualization for each event type associated with the particular line.

Figure 8F:
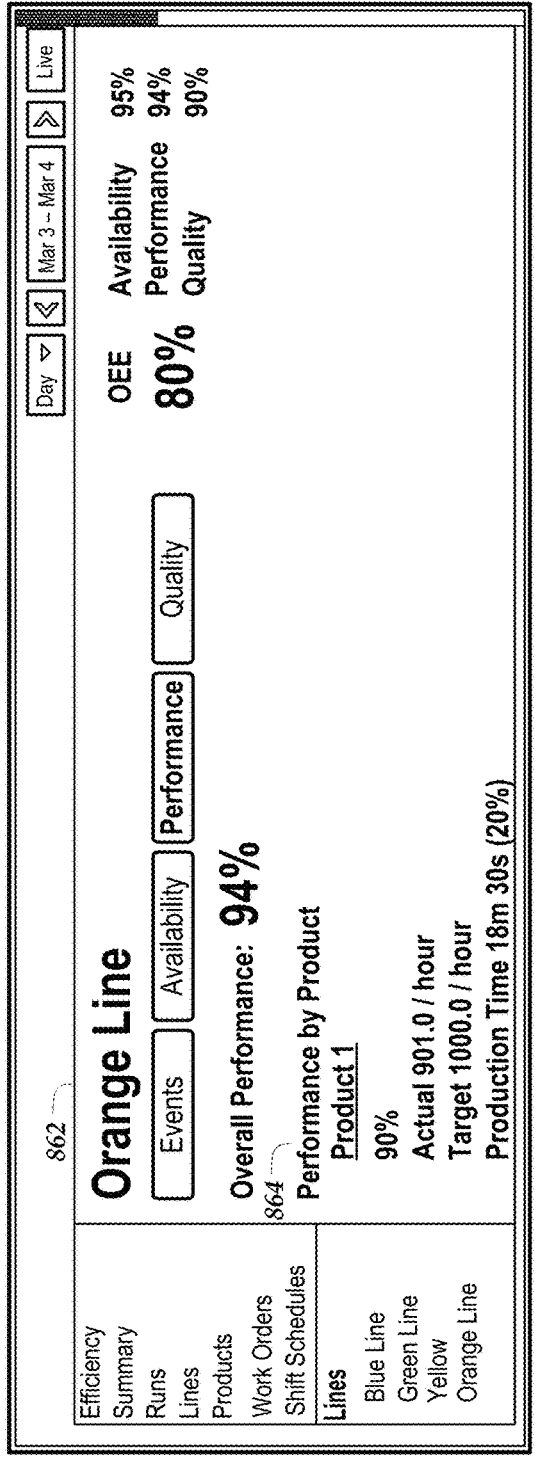
Figure 8G:
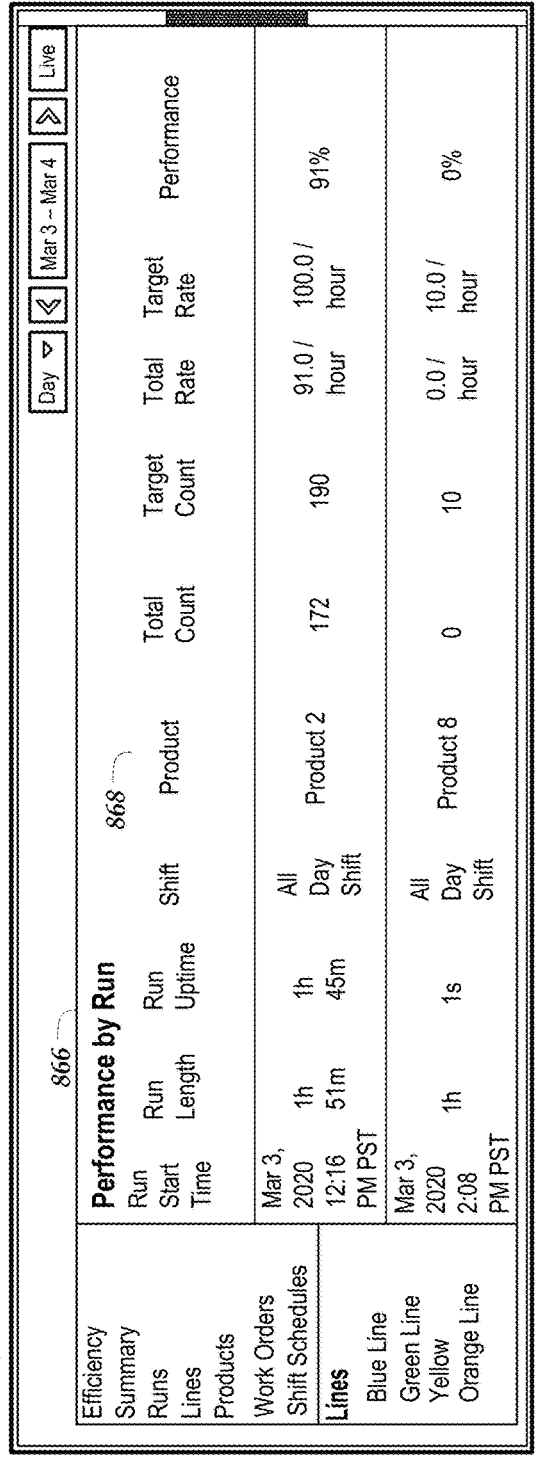

Turning to FIGS. 8F and 8G, each figure illustrates an example performance user interface 860. With respect to FIG. 8F, a first portion 862 of the performance user interface 860 can include first performance metrics 864 for a particular line, which can be grouped by item. As shown, the first performance metrics 864 can give an analyst insight into performance on an item-by-item basis. For example, the first performance metrics 864 can include, but are not limited to, a performance indicator (here 90% for "Product 1"), actual and target production rates, and a total production time for a particular item. With respect to FIG. 8G, a second portion 866 of the performance user interface 860 can include second performance metrics 868 for the particular line, which can be grouped by run. As shown, the second performance metrics 868 can give an analyst insight into performance on a run-by-run basis. For example, the second performance metrics 868 can include, but are not limited to, a performance indicator (for example, 91% for the run of "Product 2"), a run start time, run length, run uptime, a shift, an item, actual and target production counts, and actual and target production rates for a particular run.

Figure 8H:
Figure 8I:
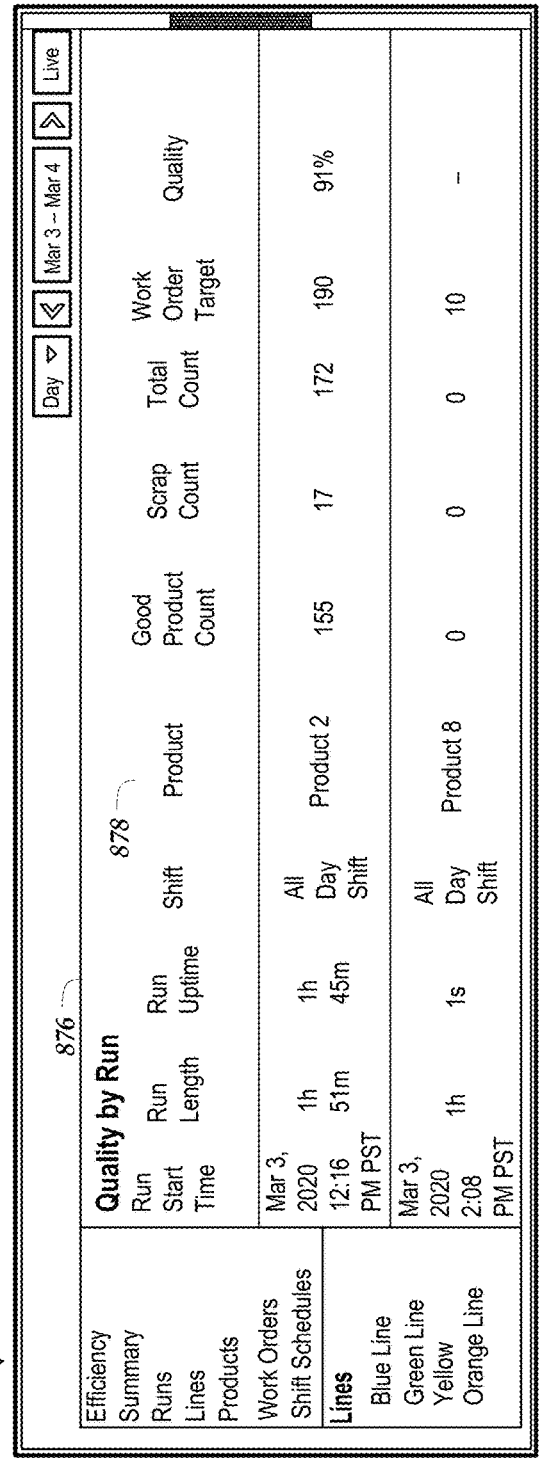

Turning to FIGS. 8H and 8I, each figure illustrates an example quality user interface 870. With respect to FIG. 8H, a first portion 872 of the quality user interface 870 can include first quality metrics 874 for a particular line, which can be grouped by item. As shown, the first quality metrics 874 can give an analyst insight into quality on an item-by-item basis. For example, the first quality metrics 874 can include, but are not limited to, a quality indicator (here 100% for "Product 1"), accepted or "good" and denied or "scrap" production counts, and a total count for a particular item. With respect to FIG. 8I, a second portion 876 of the quality user interface 870 can include second quality metrics 878 for the particular line, which can be grouped by run. As shown, the second quality metrics 878 can give an analyst insight into quality on a run-by-run basis. For example, the second quality metrics 878 can include, but are not limited to, a quality indicator (for example, 91% for the run of "Product 2"), a run start time, run length, run uptime, a shift, an item, accepted or "good" counts, denied or "scrap" counts, total counts, and target counts for a particular run.

XIII Example Configuration Graphical User Interfaces

FIGS. 9A-9C and 10 illustrate example interactive graphical user interfaces directed towards production-related configuration, according to various embodiments of the present disclosure. The interactive graphical user interfaces of FIGS.

9A-9C and 10 may be provided by the management server 140, and may be accessible via the user device(s) 120. Generally, a user can use interactive graphical user interfaces of FIGS. 9A-9C and 10 for configuration purposes related to data analysis as described herein. Typically, the graphical user interfaces provided by the management server 140 are specific to an organization, and may include configuration information associated with the organization.

Figure 9A:
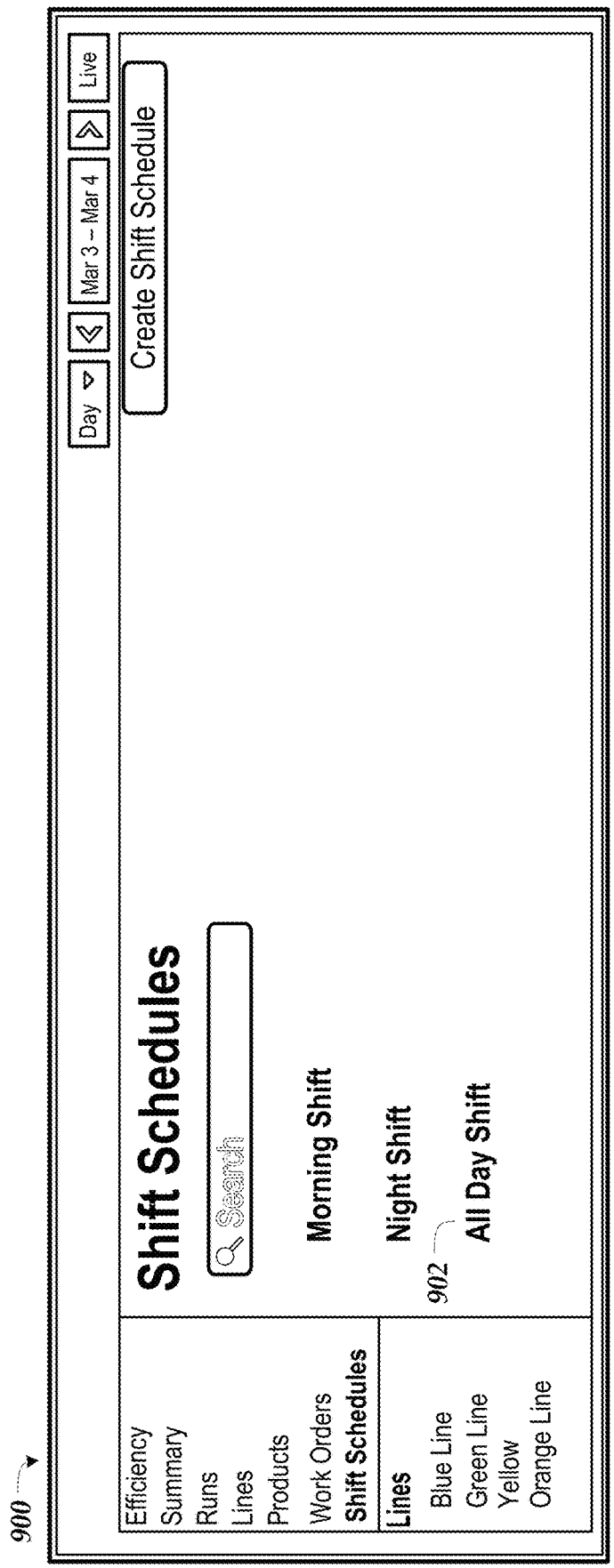

FIG. 9A illustrates an example run configuration user interface 900. The run configuration user interface 900 can be used by an analyst to configure metadata that can be associated with one or more runs. As used herein, a "shift" can refer to configuration metadata that can be associated with one or more runs and the configuration metadata can include one or more event configurations. An analyst can use the run configuration user interface 900 to search for defined run configurations (e.g., "shifts"), select an existing run configuration for viewing and/or editing, and/or create a new run configuration. As shown, an analyst can select a particular run configuration 902 (here the "All Day Shift" configuration).

Figure 9B:
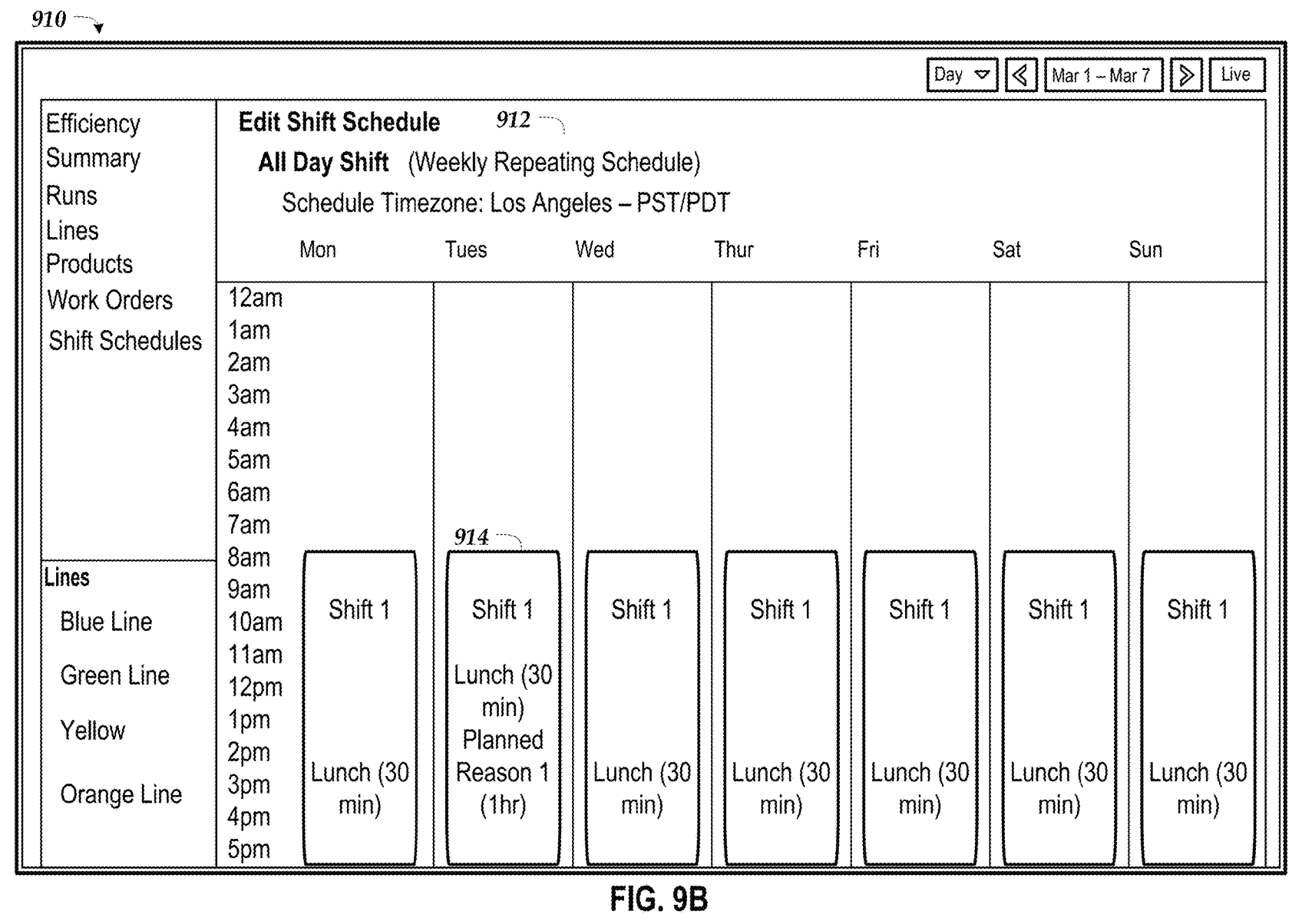
Figure 9C:
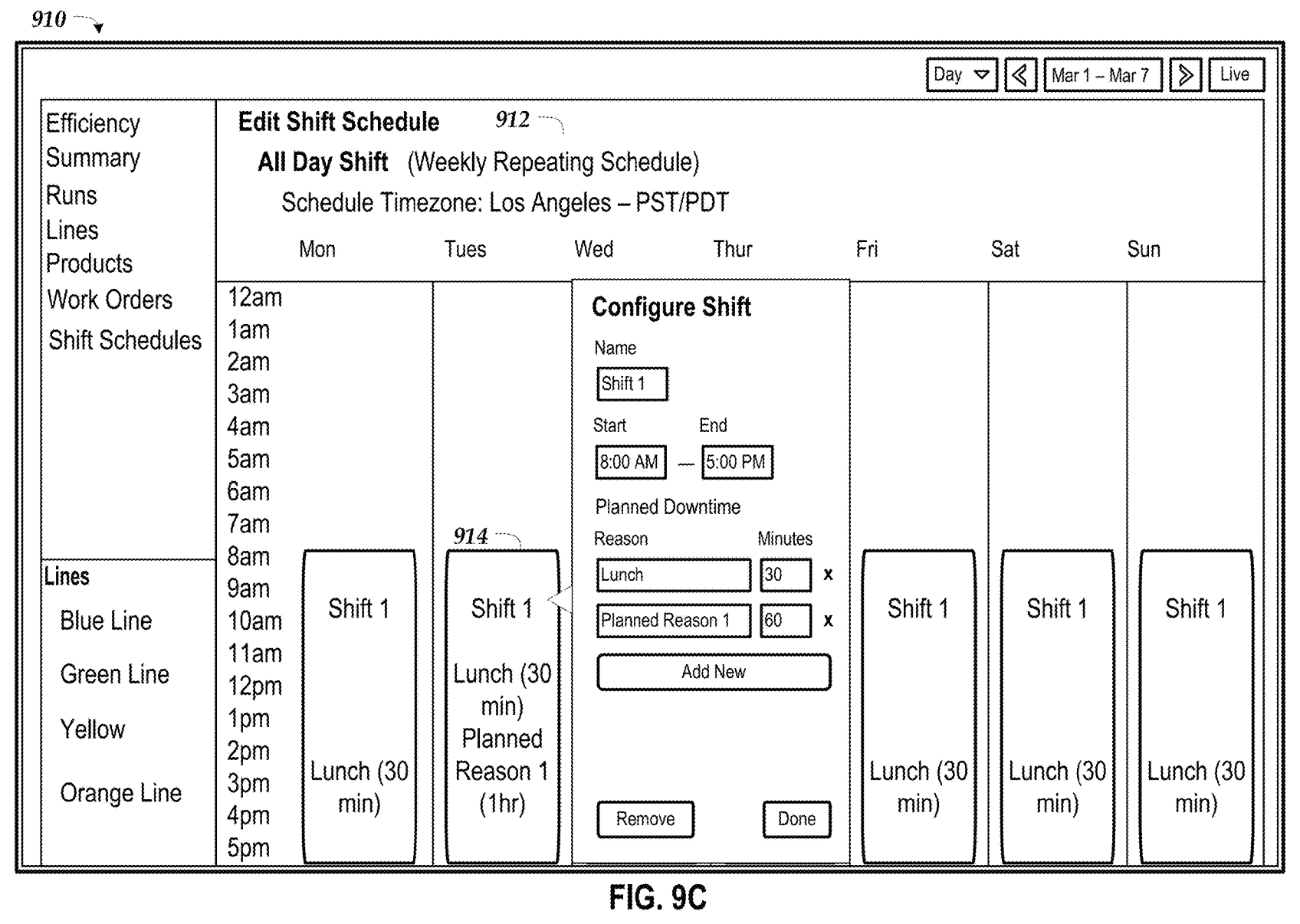

FIGS. 9B and 9C illustrate additional example run configuration user interfaces 910. In FIG. 9B, the run configuration 912 can be viewed and/or edited by an analyst. As shown, the run configuration 912 can be "repeating" in that the run configuration can apply to multiple times or days. In other words, the run configuration 912 can be a template that can be applied to multiple times or days. For example, as shown, the run configuration 912 can include a planned downtime event (such as the "Lunch" downtime event), which can be applied to multiple times or days. In some embodiments, while the run configuration 912 can apply to multiple times or days, a particular run configuration entry 914 (for example, the particular Tuesday shift) can be different than configuration entries for other days. For example, as shown, the run configuration entry 914 can include an additional planned downtime event (such as the "Planned Reason 1" downtime event) that is not included in other run configuration entries. The run configuration entry 914 can be selected by an analyst for viewing and/or editing.

Turning to FIG. 9C, the run configuration entry 914 can be viewed and/or edited by an analyst in the run configuration user interface 910. As shown, an analyst can edit the particular run configuration entry 914 by, for example, changing a start or end time or adding, deleting, or editing planned downtime events. In particular, an analyst can edit the duration of planned downtime events. As described herein, the downtime events can be considered when determining operations indicators, such as availability and/or OEE indicators.

FIG. 10 illustrates an example output configuration user interface 1000. The output configuration user interface 1000 can be used by an analyst to configure metadata that can be associated with the expected output of one or more runs. As used herein, a "work order" can refer to configuration metadata that can be associated with one or more runs and the configuration metadata can include item configurations. An analyst can use the output configuration user interface 1000 to search for defined output configurations (e.g., "work orders"), select an existing output configuration for editing, and/or create a new output configuration. An analyst can select a particular output configuration 1002 (here the "Work Order #1" configuration) to edit. As shown, the particular output configuration 1002 can include an item configuration (here "Product 2"), a target quantity, a production data, and a completed status. An operator can manually configure a run using the graphical user interfaces described above with respect to FIGS. 7A, 7D, 7E. Additionally or alternatively, an operator can select defined output configuration, such as the output configuration 1002 shown in FIG. 10, to use the defined output configuration when starting a run. As described herein, the expected output of a run can be used to determine operations indicators, such as performance and/or OEE indicators.

XIV. Example Methods and Functionality for Dynamically Determining Operations Indicator(s)

Figure 11:
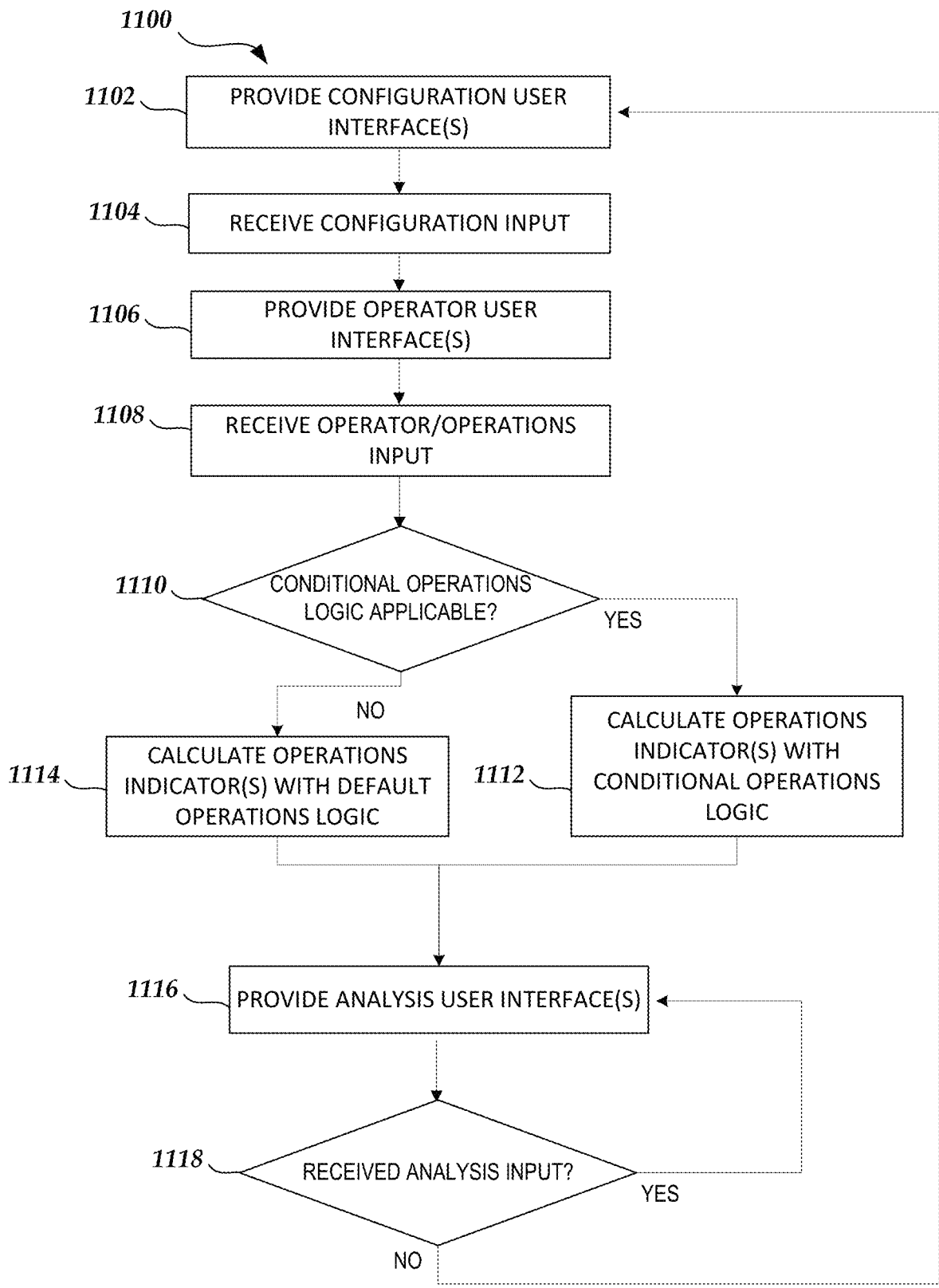
FIG. 11 is a flowchart illustrating an example method and functionality related to dynamically determining operations indicators, according to some embodiments of the present disclosure.

FIG. 11 is a flowchart illustrating an example method and functionality related to dynamically determining operations indicator(s), according to some embodiments of the present disclosure. Although the method 1100 is described in conjunction with the systems of FIG. 1, any system configured to perform the method, in any order, is within the scope of this disclosure. The method 1100 may be performed by the various components of operating environment 100 of FIG. 1 as discussed herein, including the management server 140, the human machine interface device(s) 170, and the controller device(s) 150. The method 1100 may be combined with any other method described herein.

Beginning at block 1102, configuration user interface(s) can be provided. In particular, the management server 140 can provide configuration user interface(s). Example configuration user interfaces can receive run configurations and/or output configurations, each of which can be associated with runs on a line. An example run configuration can include a downtime event. For example, the run configuration can be a defined shift and the shift can be applied to a run. The example shift can include planned downtime events, such as a lunch event or a maintenance event. Properties of run configurations that can be accessed via the user interfaces can include a schedule (such as a repeating schedule based on some frequency), a time zone, and one or more downtime events. Example user interfaces for receiving run configurations are described in further detail above with respect to FIGS. 9A-9C. An example output configuration can be a work order. An output configuration can include a target rate. Properties of output configurations that can be accessed via the user interfaces can include a target rate, an item, a target quantity, and/or a target amount of time. Example user interfaces for receiving output configurations are described in further detail above with respect to FIG. 10. The provided user interfaces can allow users to create, edit, and/or view run configuration(s) and/or output configuration(s). As described herein, the configuration user interfaces can allow users to preconfigure aspects of runs, which can expedite calculating operations indicators.

At block 1104, configuration input can be received. In particular, the management server 140 can receive configuration input. Example configuration input can include input for run configurations (such as a shift) and/or output configurations (such as a work order). Via the user interface, a user can submit user input that creates/edits a run configuration (such as a shift). In particular, a user can specify a schedule (such as a repeating schedule based on some frequency), a time zone, and/or one or more downtime events. For example, a user can define a shift that includes one or more planned downtime events (such as a lunch event). Via the user interface, a user can submit user input that creates/edits a run configuration (such as a shift). In particular, a user can specify a target rate, an item, a target quantity, and/or a target amount of time. For example, a user can define a work order that can specify that a particular line can output an item of a target quantity, target amount of time, and/or a target rate. Additional details regarding submitted input for configurations are described above in further detail with respect to FIGS. 9A-9C, 10.

At block 1106, operator user interface(s) can be provided. In particular, the controller device(s) 150 can provide operator user interface(s). As described herein, a controller device 150 can be assigned to a line. An operator assigned to a line can view the operator user interface(s) associated with the line. The industrial controller device 150 can be configured to present, via a human machine interface device (such as a tablet), the operator user interface. The industrial controller device can be configured to execute a web server. The operator user interface can be served by the web server executing on the industrial controller device. The human machine interface device can be configured to receive the operator user interface served by the web server executing on the industrial controller device. Example operator user interfaces can provide information to an operator regarding a line, a run, one or more downtime events, and/or configuration(s). Additional details regarding provided operator user interface(s) are described above in further detail with respect to FIGS. 7A-7G.

At block 1108, operator and/or operations input can be received. In particular, the management server 140 can receive operator and/or operations input. The operator user interface can be configured to receive, from the human machine interface device, user input indicating the downtime event and the downtime event type. The human machine interface device 170 (such as a tablet) can be configured to transmit, via the operator user interface, user input to the industrial controller device 150. The industrial controller device 150 can be configured to transmit, to the management server 140, the downtime event that includes at least some of the user input (such as a user selected downtime event type/reason/category). Thus, the human machine interface device 170 can receive operator input, which can also be received by/transmitted to the controller device 150, which can then be received by/transmitted to the management server 140.

Example operator input can include a downtime event and/or a downtime event type. As described herein, the controller device 150 can receive and/or detect downtime events that are uncategorized. Via the human machine interface device 170, an operator can identify one or more downtime events and a downtime event type (such as a downtime reason) to be assigned to those downtime event(s). Additional details regarding provided operator user input are described above in further detail with respect to FIGS. 7A-7D. An operator can also specify configurations input for a run, such as, but not limited to, a target rate, an item, a target quantity, and/or a target amount of time. As described herein, an operator can select a predefined configuration, such as a predefined work order and/or shift. Additional details regarding configurations input that can be provided by an operator are described above in further detail with respect to FIGS. 7E-7F.

Either before, after, and/or during operator input being received, operations input can be received. Example operations input can include, but is not limited to, downtime time data, uptime time data, a run start time, run length, an item, accepted or "good" output counts, denied or "scrap" output counts, total output counts. As described herein, and industrial process/line can include sensors and/or mechanisms for detecting operations data during production that can be received by the controller device(s) 150. The controller device(s) 150 can transmit the operations data to the management server 140.

At block 1110, it can be determined whether conditional operations logic is applicable. In particular, the management server 140 can determine whether conditional operations logic is applicable to the current set of parameters for calculating operations indicators. For example, the management server 140 can make an initial determination that a particular event type should be ignored with respect to an availability calculation. For example, planned downtime events can be ignored by default with respect to an availability calculation. However, the management server 140 can determine that some condition is satisfied with respect to the particular event type and event that is ignored by default, such as the duration of the downtime event satisfying some threshold. In response to determining that some condition is satisfied, the initial determination can be overridden and the conditional operations logic can be used to calculate the operations indicator. For example, the management server 140 can determine that conditional operations logic should be applied where a planned downtime event exceeds some time threshold (such as an allotted thirty minutes for a planned downtime event, e.g., a lunch event).

At block 1112, if it was determined that conditional operations logic was applicable, then operations indicator(s) can be calculated with conditional operations logic. In particular, the management server 140 can calculate operations indicator(s) with conditional operations logic. As described above, planned downtime events can be ignored by default with respect to an availability calculation, but where the planned downtime event satisfies the above condition (such as the downtime duration satisfying a threshold) the management server 140 override the initial determination. In particular, the management server 140 can calculate operations indicator(s) by including the downtime event in the availability calculation.

At block 1114, if it was determined that conditional operations logic was not applicable, then operations indicator(s) can be calculated with default operations logic. As described herein, example operations indicator(s) can include, but are not limited to, an overall equipment effectiveness (OEE) indicator, an availability indicator, a performance indicator, and/or a quality indicator. In some embodiments, some operations indicator(s) can be represented as percentages. The operations indicator(s) can be calculated from the operator, operations, and/or configurations input. The management server 140 can calculate an availability indicator with an equation that includes input of uptime and downtime, where downtime can be counted from qualified downtime events (such as unplanned downtime events or planned downtime events that satisfy a condition as described above with respect to the conditional operations logic block 1112). An example equation to calculate an availability indicator can be downtime divided by uptime, where downtime can be counted from qualified downtime events. The management server 140 can calculate a performance indicator with an equation that includes input of an actual rate to produce output and a target rate to produce output. An example equation to calculate a performance indicator can be an actual rate divided by a target rate. The management server 140 can calculate a quality indicator with an equation that includes input of an accepted output count and a target output count. An example equation to calculate a quality indicator can be an accepted output count divided by a target output count.

In some embodiments, calculating the operations indicator can further include determining that a downtime event type should be ignored with respect to an availability calculation. An example downtime event type to be ignored can be a planned downtime event, such as a planned lunch event. Calculating the operations indicator can further include excluding a downtime event associated with the downtime event type from the availability calculation. An operations indicator can include the availability calculation. For example, the availability calculation result in an availability indicator.

A particular operations indicator can be a combination of operations indicator(s). For example, overall equipment effectiveness ("OEE") can be a combination of availability, performance, and quality indicators. In particular, the management server 140 can calculate OEE with an equation that multiplies the availability, performance, and quality indicators. Calculating the operations indicator can further include aggregating operations data from multiple lines. For example, the management server can calculate OEE for multiple lines. An operations indicator can further represent an indicator for a line and a particular item output by the line (such as a performance indicator or a quality indicator of a line for a particular product). Examples of calculated operations indicators can be shown and/or described above in further detail with respect to FIGS. 8A-8I.

At block 1116, analysis user interface(s) can be provided. In particular, the management server 140 can provide analysis user interface(s). A user interface can include visualizations, such as an operations time visualization, and the operations indicator(s). The operations time visualization can be configured to present downtime events, downtime event types, and uptime of the line. In particular, the operations time visualization can be configured to present a timeline that visually indicates the downtime events, downtime event types, and uptime of the line. Examples of analysis user interfaces, which can include operations time visualization, timelines, and/or operations indicator(s), can be shown and/or described above in further detail with respect to FIGS. 8A-8I.

At block 1118, analysis input can be received. In particular, the management server 140 can receive analysis input. For example, the management server 140 can provide user interfaces that allow analysts to edit some operations data. In particular, the management server 140 can receive, via a user interface, user input indicating an edit to a downtime event. The management server 140 can generate an updated downtime event based at least in part on the user input and can store the updated downtime event. An example edit to a downtime event can include a change in an event type. The method 1100 can then return to block 1116 for presenting analysis user interface(s) and the analysis user interface(s) can include the updated operations data, such as updated downtime events.

Additional analysis input can include input that allows an analyst to configure the user interface to analyze the operations data. For example, an analyst can initially view operations data, such as operations indicator(s), for multiple lines and can select a particular line to drill down and view operations data for the particular line. The analyst can further interact with operations time visualization, such as by interacting with timelines, to further drill down and view operations data within specified time periods. The operations time visualization and/or timeline can be interactive and can receive user input related to particular events. An analyst can further view operations data types related to secondary indicators such as availability, performance, and quality by specifying user input. Accordingly, the method 1100 can then return to block 1116 for presenting analysis user interface(s) and the analysis user interface(s) can update in response to user input. Examples of analysis user interfaces receiving and responding to user input can be shown and/or described above in further detail with respect to FIGS. 8A-8I.

As shown, if there isn't initial or additional analysis input, the method 1100 can repeat. Additional input can be received that causes the user interface(s) to dynamically update. For example, additional downtime and uptime information can be received by the management server 140. The management server 140 can calculate updated operations indicator(s) from the additional operations data, such as downtime and uptime information. The method 1100 can provide updated user interfaces with updated visualizations and the updated operations indicator(s). The updated visualization, such as an updated time visualization, can be configured to present an updated timeline with the additional downtime and uptime information.

In various implementations, various aspects of the functionality described in reference to FIG. 11 may be accomplished in substantially real-time, e.g., received data may be processed as it is received. Alternatively, various aspects of the functionality described in reference to FIG. 11 may be accomplished in batches and/or in parallel.

XV. Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

As described above, in various embodiments certain functionality may be accessible by a user through a web-based viewer (such as a web browser), or other suitable software program. In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system comprising:
    a first industrial controller device configured to:
        present, via a human machine interface device, an operator user interface, wherein the operator user interface is configured to:
            receive, from the human machine interface device, user input indicating a first downtime event and a first downtime event type; and a management server comprising:
  a computer readable storage medium having program instructions embodied therewith; and
  one or more processors configured to execute the program instructions to cause the management server to:
    provide communications with one or more industrial controller devices, wherein the one or more industrial controller devices include inputs and/or output configured to enable communications with one or more systems or devices associated with a process;
    receive, from the first industrial controller device, the first downtime event comprising the first downtime event type and first downtime time data indicating a first duration of the first downtime event;
    receive, from the first industrial controller device, first uptime time data for a line of the process;
    calculate an operations indicator based at least in part on the first duration of the first downtime event and the first uptime time data;
    cause presentation of a user interface comprising:
      an operations time visualization, wherein the operations time visualization is configured to present:
        (i) the first downtime event, (ii) the first downtime event type, and (iii) first uptime of the line; and
      the operations indicator, wherein the user interface is interactive and allows monitoring of the process based at least in part on communication between the management server and the first industrial controller device.

2. The system of claim 1, wherein the one or more processors are configured to execute further program instructions to cause the management server to:
  receive, from the one or more industrial controller devices, a plurality of downtime events, wherein each downtime event includes a downtime event type and downtime time data indicating a duration of the downtime event;
  calculate, from the first downtime event and the plurality of downtime events, aggregated downtime data for a particular downtime event type; and
  cause presentation of a second user interface comprising (i) the aggregated downtime data and (ii) the particular downtime event type.

3. The system of claim 1, wherein the one or more processors are configured to execute further program instructions to cause the management server to:
  receive, via the user interface, user input indicating an edit to the first downtime event;
  generate an updated first downtime event based at least in part on the user input; and
  cause presentation of an updated user interface comprising the updated first downtime event.

4. The system of claim 1, wherein calculating the operations indicator further comprises: aggregating operations data from a plurality of lines.

5. The system of claim 1, wherein the user interface further comprises:
  a respective operations indicator for: (i) the line and (ii) each item of a plurality of items that is output by the line.

6. The system of claim 1, wherein the operations indicator further comprises an overall equipment effectiveness indicator.

7. The system of claim 1, wherein the one or more processors are configured to execute further program instructions to cause the management server to:
  cause presentation of a scheduling user interface comprising a schedule associated with a line of the process; and
  receive, via the scheduling user interface, a second downtime event comprising a first downtime event type and second downtime time data indicating a second duration of the second downtime event.

8. The system of claim 7, wherein the one or more processors are configured to execute additional program instructions to cause the management server to:
  receive second uptime time data for the line; and
  calculate an updated operations indicator based at least in part on the first duration of the first downtime event, the second duration of the second downtime event, and the second uptime time data.

9. The system of claim 8, wherein the one or more processors are configured to execute subsequent program instructions to cause the management server to:
  cause presentation of an updated user interface comprising the updated operations indicator.

10. The system of claim 1, wherein the process comprises a manufacturing process.

11. The system of claim 1, wherein the operations time visualization is configured to present a timeline of the line that visually indicates (i) the first downtime event, (ii) the first downtime event type, and (iii) first uptime of the line.

12. A method comprising:
  by a first industrial controller device:
    presenting, via a human machine interface device, an operator user interface, wherein the operator user interface is configured to:
      receive, from the human machine interface device, user input indicating a first downtime event and a first downtime event type; and
  by a management server comprising one or more processors configured to execute program instructions:
    providing communications with one or more industrial controller devices, wherein the one or more industrial controller devices include inputs and/or output configured to enable communications with one or more systems or devices associated with a process;
    receiving, from the first industrial controller device, the first downtime event comprising the first downtime event type and first downtime time data indicating a first duration of the first downtime event;
    receiving, from the first industrial controller device, first uptime time data for a line of the process;
    calculating an operations indicator based at least in part on the first duration of the first downtime event and the first uptime time data;
    causing presentation of a user interface comprising:
      an operations time visualization, wherein the operations time visualization is configured to present:
        (i) the first downtime event, (ii) the first downtime event type, and (iii) first uptime of the line; and
      the operations indicator, wherein the user interface is interactive and allows monitoring of the process based at least in part on communication between the management server and the first industrial controller device.

13. The method of claim 12 further comprising, by the management server:
- receiving, from the one or more industrial controller devices, a plurality of downtime events, wherein each downtime event includes a downtime event type and downtime time data indicating a duration of the downtime event;
- calculating, from the first downtime event and the plurality of downtime events, aggregated downtime data for a particular downtime event type; and
- causing presentation of a second user interface comprising (i) the aggregated downtime data and (ii) the particular downtime event type.

14. The method of claim 12 further comprising, by the management server:
- receiving, via the user interface, user input indicating an edit to the first downtime event;
- generating an updated first downtime event based at least in part on the user input; and
- causing presentation of an updated user interface comprising the updated first downtime event.

15. The method of claim 12, wherein calculating the operations indicator further comprises: aggregating operations data from a plurality of lines.

16. The method of claim 12, wherein the user interface further comprises:
- a respective operations indicator for: (i) the line and (ii) each item of a plurality of items that is output by the line.

17. The method of claim 12, wherein the operations indicator further comprises an overall equipment effectiveness indicator.

18. The method of claim 12 further comprising, by the management server:
- causing presentation of a scheduling user interface comprising a schedule associated with a line of the process; and
- receiving, via the scheduling user interface, a second downtime event comprising a first downtime event type and second downtime time data indicating a second duration of the second downtime event.

19. The method of claim 18 further comprising, by the management server:
- receiving second uptime time data for the line; and
- calculating an updated operations indicator based at least in part on the first duration of the first downtime event, the second duration of the second downtime event, and the second uptime time data.

20. The method of claim 19 further comprising, by the management server:
- causing presentation of an updated user interface comprising the updated operations indicator.

* * * * *